US010019229B2

(12) United States Patent
Elmer

(10) Patent No.: US 10,019,229 B2
(45) Date of Patent: *Jul. 10, 2018

(54) CALCULATION CONTROL INDICATOR CACHE

(71) Applicant: VIA ALLIANCE SEMICONDUCTOR CO, LTD., Shanghai (CN)

(72) Inventor: Thomas Elmer, Austin, TX (US)

(73) Assignee: VIA ALLIANCE SEMICONDUCTOR CO., LTD, Shanghai (CN)

( * ) Notice: Subject to any disclaimer, the term of this patent is extended or adjusted under 35 U.S.C. 154(b) by 42 days.

This patent is subject to a terminal disclaimer.

(21) Appl. No.: 14/748,924

(22) Filed: Jun. 24, 2015

(65) Prior Publication Data
US 2016/0004665 A1 Jan. 7, 2016

Related U.S. Application Data

(60) Provisional application No. 62/020,246, filed on Jul. 2, 2014, provisional application No. 62/173,808, filed on Jun. 10, 2015.

(51) Int. Cl.
G06F 7/483 (2006.01)
G06F 7/544 (2006.01)
(Continued)

(52) U.S. Cl.
CPC ............ G06F 7/483 (2013.01); G06F 7/4876 (2013.01); G06F 7/49957 (2013.01);
(Continued)

(58) Field of Classification Search
None
See application file for complete search history.

(56) References Cited

U.S. PATENT DOCUMENTS 4,187,539 A 2/1980 Eaton
4,974,198 A 11/1990 Ishii
(Continued)

FOREIGN PATENT DOCUMENTS

EP 0681236 11/1995
JP H10207693 A 8/1998
(Continued)

OTHER PUBLICATIONS

Hokenek, Erdem et al. "Second-Generation RISC Floating Point with Multiply-Add Fused" IEEE Journal of Solid-State Circuits, vol. 25, No. 5, Oct. 1990; pp. 1207-1213.
Lang, Tomas et al. "Floating-Point Multiply-Add-Fused with Reduced Latency" IEEE Transactions on Computers, vol. 53, No. 8, Aug. 2004; pp. 988-1003.
Bruguera, Javier D. et al. "Floating-Point Fused Multiply-Add: Reduced Lateny for Floating-Point Addition" Computer Arithmetic, 2005; pp. 42-51.
(Continued)

Primary Examiner — Michael D Yaary
(74) Attorney, Agent, or Firm — McClure, Qualey & Rodack, LLP

(57) ABSTRACT

A microprocessor comprises an instruction execution unit operable to generate an intermediate result vector and a plurality of calculation control indicators and storage external to the instruction execution unit which stores the intermediate result vector and the plurality of calculation control indicators. The intermediate result vector is generated from an application of at least a first arithmetic operation of a compound arithmetic operation. The calculation control indicators indicate how subsequent calculations to generate a final result from the intermediate result vector should proceed. The subsequent calculations may involve one or more remaining arithmetic operations of the compound arithmetic operation. The intermediate result vector, in combination with the plurality of calculation control indicators, provides sufficient information to generate a result indistinguishable from an infinitely precise calculation of the compound arithmetic operation whose result is reduced in significance to a target data size.

20 Claims, 12 Drawing Sheets

(51) Int. Cl.
| | |
|---|---|
| *G06F 9/30* | (2018.01) |
| *G06F 9/38* | (2018.01) |
| *G06F 7/487* | (2006.01) |
| *G06F 17/16* | (2006.01) |
| *G06F 7/499* | (2006.01) |
| *G06F 7/485* | (2006.01) |

(52) U.S. Cl.
CPC .......... *G06F 7/5443* (2013.01); *G06F 9/3001* (2013.01); *G06F 9/30014* (2013.01); *G06F 9/3017* (2013.01); *G06F 9/30185* (2013.01); *G06F 9/38* (2013.01); *G06F 9/3893* (2013.01); *G06F 17/16* (2013.01); *G06F 7/485* (2013.01)

(56) References Cited

U.S. PATENT DOCUMENTS

| | | | |
|---|---|---|---|
| 5,347,481 | A | 9/1994 | Williams |
| 5,375,078 | A | 12/1994 | Hrusecky et al. |
| 5,880,983 | A | 3/1999 | Elliott et al. |
| 5,880,984 | A | 3/1999 | Burchfiel et al. |
| 5,990,351 | A | 11/1999 | Cabre et al. |
| 6,094,668 | A * | 7/2000 | Oberman ............... G06F 7/483 708/505 |
| 6,233,672 | B1 | 5/2001 | Lynch |
| 6,779,013 | B2 * | 8/2004 | Pangal .................... G06F 7/483 708/503 |
| 6,947,962 | B2 * | 9/2005 | Hoskote ............... G06F 7/4991 708/498 |
| 7,080,111 | B2 * | 7/2006 | Pangal .................. G06F 7/5443 708/501 |
| 7,117,372 | B1 | 10/2006 | Trimberger et al. |
| 7,401,107 | B2 | 7/2008 | Lutz et al. |
| 7,689,641 | B2 | 3/2010 | Abel et al. |
| 7,917,568 | B2 | 3/2011 | Henry et al. |
| 8,046,399 | B1 | 10/2011 | Inaganti et al. |
| 8,386,755 | B2 | 2/2013 | Elmer et al. |
| 8,577,948 | B2 | 11/2013 | Srinivasan et al. |
| 8,671,129 | B2 | 3/2014 | Brooks et al. |
| 2004/0098439 | A1 | 5/2004 | Bass et al. |
| 2004/0267857 | A1 | 12/2004 | Abel et al. |
| 2005/0125476 | A1 | 6/2005 | Symes et al. |
| 2006/0136543 | A1 | 6/2006 | Lutz et al. |
| 2006/0184601 | A1 | 8/2006 | Trong et al. |
| 2007/0038693 | A1 | 2/2007 | Jacobi et al. |
| 2007/0266071 | A1 | 11/2007 | Dockser et al. |
| 2008/0016321 | A1 | 1/2008 | Pennock et al. |
| 2008/0215659 | A1 | 9/2008 | Cowlishaw et al. |
| 2008/0256150 | A1 | 10/2008 | Quinnell et al. |
| 2008/0256161 | A1 | 10/2008 | Quinnell et al. |
| 2009/0248769 | A1 | 10/2009 | Chua |
| 2010/0268920 | A1 | 10/2010 | Brooks et al. |
| 2011/0029760 | A1 | 2/2011 | Elmer et al. |
| 2011/0072066 | A1 | 3/2011 | Lutz et al. |
| 2012/0072703 | A1 | 3/2012 | Srinivasan et al. |
| 2012/0215823 | A1 | 8/2012 | Lutz |
| 2014/0006467 | A1 | 1/2014 | Samudrala et al. |
| 2014/0122555 | A1 | 5/2014 | Hickmann et al. |
| 2014/0188966 | A1 | 7/2014 | Galal et al. |
| 2017/0097824 | A1 | 4/2017 | Elmer et al. |

FOREIGN PATENT DOCUMENTS

| | | |
|---|---|---|
| WO | WO2007094047 | 8/2007 |
| WO | WO2012040632 | 3/2012 |

OTHER PUBLICATIONS

Vangal, Sriram R. et al. "A 6.2-GFlops Floating-Point Multiply-Accumulator With Conditional Normalization" IEEE Journal of Solid-State Circuits, vol. 41, No. 10, Oct. 2006. pp. 2314-2323.
Galal, Sameh et al. "Energy Efficient Floating-Point Unit Design", IEEE Transactions on Computers, vol. 60, No. 7, Jul. 2011; pp. 913-922.
Srinivasan, Suresh et al. "Split-path Fused Floating Point Multiply Accumulate (FPMAC)", 2013 IEEE 21st Symposium on Computer Arithmetic; pp. 17-24.
Srinivasan, Suresh et al. "Split-path Fused Floating Point Multiply Accumulate (FPMAC)" 2014 Symposium on Computer Arithmetic. Austin TX, (slides from www.arithsymposium.org) pp. 1-19.
Quach, Nhon et al. "Suggestions for Implementing a Fast IEEE Multiply-Add-Fused Instruction" (Stanford) Technical Report CSL-TR-91-483 Jul. 1991; pp. 1-17.
Seidel, Peter-Michael. "Multiple Path IEEE Floating-Point Fused Multiply-Add", IEEE 2004; pp. 1359-1362.
Huang, Libo et al. "A New Architecture for Multiple-Precision Floating-Point Multiply-Add Fused Unit Design" 18th IEEE Symposium on Computer Arithmetic. 2007 IEEE pp. 1-8.
Paidimarri, Arun et al. "FPGA Implementation of a Single-Precision Floating-Point Multiply-Accumulator with Single-Cycle Accumulation" 2009 17th IEEE Symposium on Field Programmable Custom Computing Machines. 2009 IEEE. pp. 267-270.
Walla, Abd El Aziz Ibrahim. "Binary Floating Point Fused Multiply Add Unit" Thesis Submitted to Cairo University, Giza, Egypt, 2012 (retr from Google). pp. 1-100.
Quinnell, Eric Charles. "Floating-Point Fused Multiply-Add Architectures" Dissertation Presented to Univ Texas at Austin, May 2007. pp. 1-150.
Author Unknown. "AMD Athlon™ Processor Floating Point Capability", AMD White Paper Aug. 28, 2000.
Cornea, Marius et al. "Intel® Itanium® Floating-Point Architecture" ACM, Jun. 6, 2003. pp. 1-9.
Gerwig, G. et al. "The IBM eServer z990 Floating-Point Unit", IBM Journal Res & Dev. vol. 48, No. 3/4. May, Jul. 2004. pp. 311-322.
Wait, C.D., "IBM PowerPC 440 FPU with complex-arithmetic extensions" IBM Journal Res & Dev. vol. 49, No. 2/3. Mar., May 2005. pp. 249-254.
Chatterjee, S. et al. "Design and exploitation of a high-performance SIMD floating-point unit for Blue Gene/L" IBM Journal Res & Dev. vol. 49, No. 2/3, Mar., May 2005. pp. 377-391.
Seidel, Peter-Michael. "Multiple Path IEEE Floating-Point Fused Multiply-Add." Proc 46th Int. IEEE MWSCAS, 2003 pp. 1-4.
Wikipedia "CPU Cache" Downloaded from http://en.wikipedia.org/wiki/Cache_memory on Jan. 11, 2017. pp. 1-11.
Knowles, Simon. "Arithmetic Processor Design for the T9000 Transputer" SPIE vol. 1566 Advanced Signal Processing Algorithms, Architectures, and Implementations II. 1991 pp. 230-243.
Schmookler, M. et al. "Leading Zero Anticipation and Detection—A Comparison of Methods" IEEE Xplore. Downloaded Apr. 21, 2009 pp. 7-12.
Schwarz, E et al. "FPU Implementations with Denormalized Numbers" IEEE Transactions on Computers, vol. 54, No. 7, Jul. 2005. pp. 825-836.
Schwarz, E. et al. "Hardware Implementations of Denormalized Numbers" Proceeding of the 16th IEEE Symposium on Computer Arithmetic. 2003 IEEE. pp. 1-9.
Trong, S. et al. "P6 Binary Floating-Point Unit" IEEE Xplore Conference Paper. Jul. 2007. pp. 1-10.

* cited by examiner

CALCULATION CONTROL INDICATOR CACHE

RELATED APPLICATIONS

This application claims the benefit of U.S. Provisional Patent Application No. 62/020,246, filed Jul. 2, 2014, and entitled "Non-Atomic Split-Path Fused Multiply-Accumulate with Rounding cache," and U.S. Provisional Patent Application No. 62/173,808, filed Jun. 10, 2015, and entitled "Non-Atomic Temporally-Split Fused Multiply-Accumulate Apparatus and Operation Using a Calculation Control Indicator Cache and Providing a Split-Path Heuristic for Performing a Fused FMA Operation and Generating a Standard Format Intermediate Result," both of which are herein incorporated by reference.

This application is also related to and incorporates by reference the following simultaneously-filed applications: VAS.3043, entitled "Temporally Split Fused Multiply-Accumulate Operation," VAS.3044, entitled "Calculation Control Indicator Cache," VAS.3045, entitled "Calculation Control Indicator Cache," VAS.3046, entitled "Standard Format Intermediate Result," VAS.3047, entitled "Split-Path Heuristic for Performing a Fused FMA Operation," VAS.3048, entitled "Subdivision of a fused compound arithmetic operation," and VAS.2779, entitled "Non-atomic Split-Path Fused Multiply-Accumulate."

FIELD OF THE INVENTION

This application relates to microprocessor designs for performing arithmetic operations, and more particularly, fused FMA operations.

BACKGROUND

In design of modern computers, fused floating-point multiply-accumulate (FMA) calculations have been an area of significant commercial interest and academic research from at least as early as about 1990. A fused FMA calculation is an arithmetic operation of a form $\pm A*B \pm C$, wherein A, B and C are floating point input operands (a multiplicand, a multiplier, and an accumulator, respectively), and wherein no rounding occurs before C is accumulated to a product of A and B. The notation $\pm A*B \pm C$ includes but is not limited to the following cases: (a) $A*B+C$; (b) $A*B-C$; (c) $-A*B+C$; (d) $-A*B-C$; (e) $A*B$ (i.e., C is set to 0); and (f) $A+C$ (i.e., where B is set to 1.0).

IBM's RISC System/6000 ca. 1990 provided an early commercial implementation of this arithmetic capability as an atomic, or inseparable, calculation. Subsequent designs optimized the FMA calculation.

In their 2004 article "Floating-Point Multiply-Add-Fused with Reduced Latency," authors Tomas Lang and Javier D. Bruguera ("Lang et al.") taught several important aspects related to optimized FMA design, including: precalculation of an exponent difference and accumulator shift/align amount, alignment of accumulator in parallel with a multiply array, use of 2's complement accumulator when necessary, conditional inversion of Sum & Carry vectors, normalization of Sum & Carry vectors before a final add/round module, overlapping operation of LZA/LOA with a normalization shift, separate calculation of carry, round, guard, & sticky bits, and the use of a dual sum adder having a 1 m width (where m is the width of a mantissa of one of the operands) in a unified add/round module.

In their 2005 article "Floating-Point Fused Multiply-Add: Reduced Latency for Floating-Point Addition," authors Tomas Lang and Javier D. Bruguera ("Lang et al. II") taught the use of a split (or double) data path separating alignment from normalization cases, wherein a "close" data path was used for effective subtractions with exponent difference among {2,1,0,−1} (a concept further developed and significantly improved upon in the detailed description), and a "far" data path was used for all remaining cases. Lang et al. II also taught use of dual alignment shifters in the far data path for the carry-save output of the multiply array, and a very limited alignment shift in the close data path.

In the 2004 article "Multiple Path IEEE Floating-Point Fused Multiply-Add," author Peter-Michael Seidel ("Seidel") taught that other enhancements to FMA design may be realized by considering multiple parallel computation paths. Seidel also taught deactivation of gates on paths that are not used; determination of multiple computation paths from exponent difference and effective operation; use of two distinct computation paths, one for small exponent differences wherein mass cancellation may occur, and another for all other cases; the insertion of the accumulator value into the significant product calculation for cases corresponding to small exponent differences with effective subtraction.

Present day ubiquity of personal, portable computing devices that provide extensive media delivery and internet content access require even further efforts to design FMA logic that is cheaper to produce, consumes significantly less power and energy, and permits a higher throughput of instruction results.

The predominant approach to performing an FMA operation involves the use of unified multiply-accumulate units to perform the entire FMA operation, including rounding the result. Most academic proposals and commercial implementations generally describe a monolithic, or atomic, functional unit having the capability to multiply two numbers, add the unrounded product to a third operand, the addend or accumulator, and round the result.

An alternative approach is to use a conventional multiply unit to perform the A*B sub-operation and then a conventional add unit to accumulate C to the product of A and B. But this conventional split-unit approach sacrifices the speed and performance gains that can be obtained by accumulating C with the partial products of A and B in the same unit. The conventional split-unit approach also involves two rounding operations. The product of A and B is rounded and then the accumulation of C to the products of A and B is rounded. Accordingly, the conventional split-unit approach sometimes produces a different and less accurate result than the unified approach. Also, because of its double-rounding operation, the conventional split-unit approach cannot perform a "fused" FMA operation and does not comply with the IEEE 754 technical standard for floating-point computations.

Because FMA hardwares may serve multiple computing purposes and enable compliance with IEEE 754, computer designers frequently seek to entirely replace prior separate multiply and add functional units with atomic FMA execution units in modern products. However, there are multiple detriments to this approach.

First, the implementation cost of an FMA hardware is generally more, and the implementation more complex, than separate multiply and add functional units. Second, when performing a simple addition or multiplication, the latency through an FMA hardware is greater than a separate add or multiply functional unit and generally consumes more power. Third, the combination of multiply and add capabilities into one functional unit, in a superscalar computer processor design, reduces the number of available ports to which an arithmetic instruction may be dispatched, reducing the computer's ability to exploit parallelism in source code, or machine level, software.

This third detriment may be addressed by adding more functional units, such as a stand-alone adder functional unit, which further increases implementation cost. Essentially, an additional adder (for example) becomes the price of maintaining acceptable instruction level parallelism (ILP) while providing atomic FMA capability. This then contributes to increased overall implementation size and increased parasitic capacitance and resistance. As semiconductor manufacturing technology trends toward smaller feature sizes, this parasitic capacitance and resistance contributes more significantly to the timing delay, or latency, of an arithmetic calculation. This timing delay is sometimes modeled as a delay due to "long wires." Thus, the addition of separate functional units to compensate for diminished ILP with atomic FMA implementations provides diminishing returns relative to die space required, power consumption, and latency of arithmetic calculation.

As a result, the best proposals and implementations generally (but not always) provide the correct arithmetic result (with respect to IEEE rounding and other specifications), sometimes offer higher instruction throughput, increase cost of implementation by requiring significantly more hardware circuits, and increase power consumption to perform simple multiply or add calculations on more complex FMA hardware.

The combined goals of modern FMA design remain incompletely served.

SUMMARY

In one aspect, a microprocessor is provided comprising an instruction execution unit operable to generate an intermediate result vector and to concomitantly generate a plurality of calculation control indicators. The calculation control indicators indicate how subsequent calculations to generate a final result from the intermediate result vector should proceed, and at least a portion of the indicators are derived from and during the calculation and/or generation of the intermediate result vector. The microprocessor also comprises storage external to the instruction execution unit which stores the intermediate result vector and the plurality of calculation control indicators.

In one implementation, the instruction execution unit is an arithmetic processing unit configured with three or more operand inputs. Also, the intermediate result vector is generated from an application of a first arithmetic operation of a compound arithmetic operation to at least two of the operand inputs. The plurality of calculation control indicators indicate how a second arithmetic operation of the compound arithmetic operation, using a second arithmetic operator of a compound arithmetic operation, should proceed.

In one implementation, the compound arithmetic operation is a sequential arithmetic operation. In a more particular implementation, the first and second arithmetic operators are fundamental arithmetic operators, selected from the group consisting of add, subtract, multiply, and divide. In an even more particular implementation, the compound arithmetic operation is a multiply-accumulate operation, the first arithmetic operation is at least a multiply of a multiplicand operand with a multiplier operand, and the second arithmetic operation is an accumulation of an accumulation operand to a product of the multiplicand and multiplier operands.

In one implementation, the intermediate result vector, considered in isolation from the calculation control indicators, is represented with fewer bits than necessary to consistently generate an arithmetically correct representation of the compound arithmetic operation. On the other hand, the intermediate result vector, in combination with the plurality of calculation control indicators, provides sufficient information to generate an arithmetically correct representation of the compound arithmetic operation. The definition of an arithmetically correct representation of the compound arithmetic operation is one that is indistinguishable from a representation that would be generated by that result of an infinitely precise calculation of the compound arithmetic operation that was reduced in significance to a target data size.

For example, the intermediate result vector may be an unrounded truncated value consisting of the most significant bits of a result of the first arithmetic operation. The excision of the least significant bits results in a loss of information that may be essential to producing a correctly rounded final result of the compound arithmetic operation. In this implementation, the least significant bits would be compressed into one or more calculation control indicators—more specifically, rounding control indicators—that provide sufficient information for generating an arithmetically correct rounded result from the intermediate result vector.

In one implementation, the storage comprises a general purpose storage and a calculation control indicator storage. The two storages are distinguishable in that the general purpose storage is accessible by most instructions of an instruction set of the microprocessor to store instruction results, while the calculation control indicator storage is accessible only to instructions operable to store or load a calculation control indicator.

Furthermore, the microprocessor comprises a result bus and a data path that is separate and distinct from the result bus. The result bus conveys results from the instruction execution unit to the general purpose storage. The data path runs between the instruction execution unit and the calculation control indicator storage to enable storing and loading of calculation control indicators to and from the calculation control indicator storage.

In one implementation, the calculation control indicators provide information regarding how much of the compound arithmetic operation has been completed in generating the intermediate result vector. In another implementation, the calculation control indicators provide information regarding whether the first arithmetic operation resulted in an underflow or overflow condition.

In another aspect, a method is provided in a microprocessor of performing an arithmetic operation. The method comprises using an instruction execution unit to generate an intermediate result vector and a plurality of calculation control indicators that indicate how subsequent calculations to generate a final result from the intermediate result vector should proceed. The method also comprises storing the intermediate result vector and the plurality of calculation control indicators in memory external to the instruction execution unit.

In one implementation, the method further comprises loading the intermediate result vector and the plurality of calculation control indicators from memory and performing calculations on the intermediate result vector in accordance with the calculation control indicators to generate a final result.

In one implementation, the arithmetic operation is a compound or sequential arithmetic operation. In another implementation, the arithmetic operation is a fused operation involving at least one multiplication and at least one accumulation. In a more particular implementation, the arithmetic operation is a fused floating point multiply-accumulate operation whose operands include a multiplicand, a multiplier, and an accumulator, and wherein the intermediate result vector is a sum of at least partial products of the multiplicand and the multiplier.

In one implementation, the method further comprises splitting a compound arithmetic operation into a first arithmetic operation using a first arithmetic operand and a second arithmetic operation using a second arithmetic operand. The calculation control indicators may indicate how the second arithmetic operation should proceed, provide information regarding how much of the compound arithmetic operation has been completed in generating the intermediate result vector, and/or provide information regarding whether the first arithmetic operation resulted in an underflow or overflow condition.

In one implementation, the intermediate result vector has fewer bits (e.g., m bits) than a germinal result (which may have 2 m or more bits). Thus, the intermediate result vector, when considered in isolation from the calculation control indicators, is represented with fewer bits than necessary to consistently generate an arithmetically correct representation of the compound arithmetic operation. However, the intermediate result vector, in combination with the plurality of calculation control indicators, provide sufficient information to generate an arithmetically correct representation of the compound arithmetic operation.

In another aspect, a microprocessor is provided comprising a plurality of instruction execution units configured to generate unrounded results and a plurality of rounding indicators for rounding the unrounded results. The microprocessor further comprises a rounding cache, which may be an associative cache, external to the instruction execution units configured to store the plurality of rounding indicators.

In one implementation, the microprocessor further comprises a general purpose memory store, distinct from the rounding cache, for storing unrounded results generated by the plurality of instruction execution units. In a more particular implementation, the microprocessor further comprises a rounding bit transfer path, and a result bus distinct from the rounding bit transfer path, wherein the instruction execution units are configured to output the unrounded results to the result bus and to output the rounding indicators on the rounding bit transfer path to the rounding cache.

In one implementation, the at least one of the plurality of instruction execution units is configured to generate an unrounded result in response to an instruction of a first type and a rounded result in response to an instruction of a second type. In another implementation, the microprocessor is configured to supply (a) an unrounded result generated by a first instruction execution unit to a second instruction execution unit and (b) at least one of the plurality of rounding indicators from the rounding cache to the second instruction execution unit. The second instruction execution unit is configured to perform a mathematical operation on at least the unrounded result operand to generate a final rounded result using the supplied at least one of the plurality of rounding indicators.

In another aspect, a microprocessor is provided comprising a first instruction execution unit operable to generate an intermediate result vector and a plurality of calculation control indicators that indicate how subsequent calculations to generate a final result from the intermediate result vector should proceed. The microprocessor further comprises a forwarding bus external to the instruction execution unit configured to forward the intermediate result vector and the plurality of calculation control indicators to a second instruction execution unit. In one implementation, the first instruction execution unit is configured to generate an unrounded result in response to an instruction of a first type and a rounded result in response to an instruction of a second type.

In another aspect, a method is provided in a microprocessor for performing a rounding operation. A first instruction execution unit generates an unrounded result. Then, at least one rounding indicator is stored into a rounding cache external to the first instruction execution unit. A second instruction execution unit later reads the unrounded result and the at least one rounding indicator from the rounding cache and generates a final rounded result from these inputs and optionally from one or more other operands.

In one implementation, the method further comprises storing the unrounded result in a general purpose storage that is distinct from the rounding cache. In a more particular implementation, the method further comprises transferring the one rounding indicator from the first instruction unit to the rounding cache through a data path that is separate from a result bus coupling the plurality of instruction execution units to a general purpose storage.

In another aspect, a method is provided in a microprocessor of performing an arithmetic operation. A first instruction execution unit generates an intermediate result vector and a plurality of calculation control indicators that indicate how subsequent calculations to generate a final result from the intermediate result vector should proceed. The intermediate result vector and the plurality of calculation control indicators are then forwarded to a second instruction execution unit. The second instruction execution unit then generates the final result and completes the arithmetic operation in accordance with the calculation control indicators.

In one implementation, the arithmetic operation is a compound arithmetic operation. In a more particular implementation, the compound arithmetic operation is of a fused type, a fused type being one in which only a single rounding is permitted to generate the final result. In an even more particular implementation, the arithmetic operation is a fused multiply-accumulate operation, the intermediate result vector is an unrounded result of a portion of the multiply-accumulate operation, and the calculation control indicators include rounding indicators for generating a final rounded result of the multiply-accumulate operation.

In one implementation, forwarding of the intermediate result vector is done via a result bus and forwarding of the calculation control characters is done via a data path that is distinct from the result bus.

The methods and apparatuses described herein minimize the required circuitry, implementation cost and incremental power consumption of compound arithmetic operations. At a high level, the apparatus and method separates the compound arithmetic operation into at least two sub-operations performed by physically and/or logically separate hardware units, each of which performs parts of the compound arithmetic operation calculation. Extra bits needed for rounding or calculation control are stored, in between the two operations, in cache. The sub-operations are done in different times and places, with the necessary pieces of data assembled to accomplish the final rounding.

There are several notable advantages to the method and apparatus, particularly as applied to FMA operations.

First, the method and apparatus identifies and separates FMA calculations into at least two types and performs portions of either calculation type in a temporally or physically dissociated manner.

Second, the method and apparatus translates or transforms an atomic, or unified FMA instruction from an instruction set architecture [ISA] into at least two sub-operations.

Third, the method and apparatus allows the sub-operations to be executed allowing them to be executed in a non-atomic, or temporally or physically dissociated manner, for example, in an out-of-order, superscalar computer processor device.

Fourth, some of the necessary arithmetic operations for an FMA calculation (corresponding to, for example, some of a first type of FMA, or alternately some of second type of FMA) are performed during execution of a first specialized microinstruction.

Fifth, the method and apparatus precalculates the FMA sign data in a novel manner.

Sixth, the method and apparatus saves some part of the result of an intermediate result calculation, for example, in a result (rename) register.

Seventh, the method and apparatus saves some other part of the result of that calculation, for example, to another storage element that may be called a rounding cache or a calculation control indicator cache.

Eighth, the method and apparatus saves these collective data, called the intermediate result, in a novel standardized Storage Format. Furthermore, the method and apparatus potentially forwards rather than saves the storage format intermediate result to a subsequent second microinstruction of special type.

Ninth, the method and apparatus accesses the rounding cache when desired to provide saved data to a subsequent second microinstruction.

Tenth, the method and apparatus selectively provides the FMA addend to the second microinstruction or zeroes that input in response to data from the rounding cache.

Eleventh, the method and apparatus performs the remaining necessary arithmetic FMA calculations for either a first or second type during execution of a second (or more) specialized microinstruction using the storage format intermediate result as input.

Twelfth, the method and apparatus provides a combination of minimal modifications to prior art multiply and add hardware execution units in combination with described rounding cache and in combination with a data forwarding network operable to bypass the rounding cache.

Thirteenth, the method and apparatus does not diminish availability of dispatch ports for arithmetic calculations or compromise the computer's ability to exploit ILP with respect to a particular invested hardware cost.

It will be appreciated that the invention can be characterized in multiple ways, including but not limited to individual aspects described in this specification or to combinations of two or more of the aspects described in the specification, and including any single one of any combination of the advantages described above.

DETAILED DESCRIPTION

Microprocessor

Figure 1:
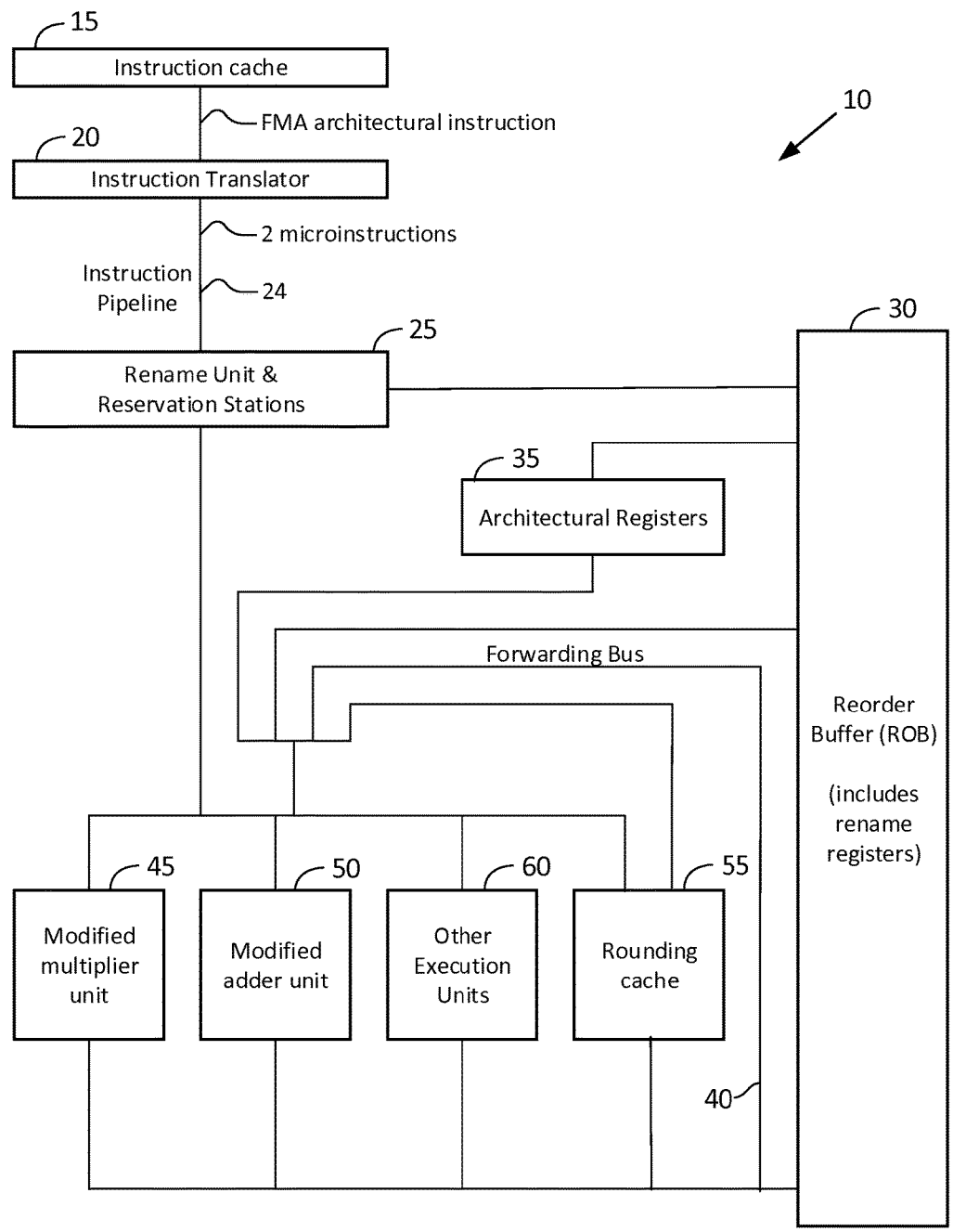
FIG. 1 is a top-level diagram of one embodiment of a microprocessor having execution units and a rounding or calculation control indicator cache configured to execute FMA calculations using two sub-operations, a modified multiplier, and a modified adder.

Referring now to FIG. 1, a block diagram illustrating a microprocessor 10 is shown. The microprocessor 10 has a plurality of execution units 45, 50, 60 configured to execute FMA calculations. The microprocessor 10 includes an instruction cache 15, an instruction translator and/or microcode ROM 20, a rename unit and reservation stations 25, a plurality of execution units—including a modified multiplier 45, a modified adder 50, and other execution units 60—a rounding cache 55 (alternatively referred to as calculation control indicator storage), architectural registers 35, and a reorder buffer 30 (including rename registers). Other functional units (not shown) may include a microcode unit; branch predictors; a memory subsystem including a cache memory hierarchy (e.g., level-1 data cache, level 2 cache), memory order buffer, and memory management unit; data prefetch units; and a bus interface unit, among others. The microprocessor 10 has an out-of-order execution microarchitecture in that instructions may be issued for execution out of program order. More specifically, microinstructions, into which architectural instructions (or macroinstructions) are translated or transformed, may be issued for execution out of program order. The program order of the microinstructions is the same as the program order of the respective architectural instructions from which they were translated or transformed. The microprocessor 10 also has a superscalar microarchitecture in that it is capable of issuing multiple instructions per clock cycle to the execution units for execution. In one implementation, the microprocessor 10 provides for execution of instructions in a manner compatible with the x86 instruction set architecture.

The instruction cache 15 caches architectural instructions fetched from system memory. The instruction translator and/or microcode ROM 20 translates or transforms the architectural instructions fetched from the instruction cache 15 into microinstructions of a microinstruction set of the microarchitecture of the microprocessor 10. The execution units 45, 50, 60 execute the microinstructions. The microinstructions into which an architectural instruction is translated or transformed implement the architectural instruction. The rename unit 25 receives and allocates entries in the ROB 30 for microinstructions in program order, updates the microinstruction with the index of the allocated ROB entry, dispatches each microinstruction to the appropriate reservation station 25 associated with the execution unit that will execute the microinstruction, and performs register renaming and dependency generation for the microinstructions.

Categorizing Calculations by Types

Figure 2:
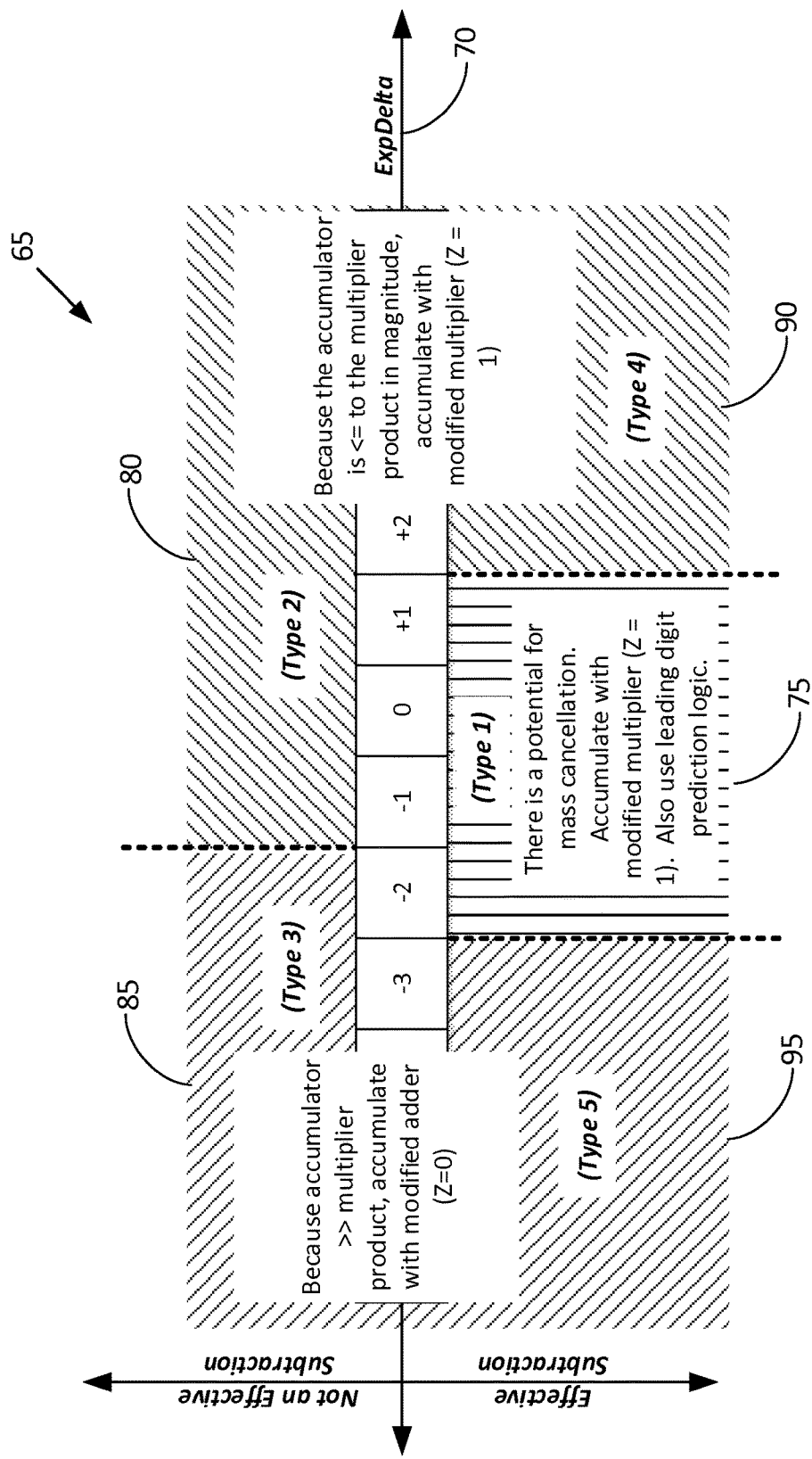
FIG. 2 is a diagram illustrating an exemplary (but non-limiting) subdivision of a number space into five types of FMA calculations.

In one aspect of one implementation of the invention, FMA calculations are distinguished based upon the differences in the exponent values of the input operands, denoted by the variable ExpDelta, and whether the FMA calculation involves an effective subtraction. FIG. 2 illustrates a number space 65 that includes a number line 70 representing the value ExpDelta. Areas below the number line 70 signify that the calculation constitutes an effective subtraction. Areas above the number line 70 signify that the calculation constitutes an effective addition (i.e., no effective subtraction).

The exponent difference, ExpDelta, is the sum of multiplier and multiplicand input exponent values, minus any exponent bias value, minus an addend or subtrahend input exponent value. Calculations in which the accumulator is much larger than the bias-adjusted product vector will be characterized by negative ExpDeltas. Likewise, calculations in which the accumulator is much smaller than the bias-adjusted product vector will be characterized by positive ExpDeltas.

An "effective subtraction," designated by the variable EffSub, signals that the signs of the input operands and the desired operation (e.g. multiply-add or multiply-subtract) will combine to cause an effective reduction of the magnitude of the floating point number result rather than an effective increase in the magnitude of the result. For example, a negative multiplicand when multiplied by a positive multiplier (negative product) and then added to a positive addend would yield an effective reduction of the magnitude of the result, and would be designated an effective subtraction (EffSub).

When the magnitude of the product vector dominates the result—as illustrated on the right side of the number space 65 of FIG. 2—the accumulator may contribute directly to the initial round bit or sticky bit calculation. As discussed below, the relative alignment of the accumulator and product mantissa favors adding the two together before calculating bits that contribute to rounding. The number space 65 of FIG. 2 designates such cases in which there is no "effective subtraction" as a "Type 2" calculation 80, and such cases in which there is an effective subtraction as a "Type 4" calculation 90.

When the accumulator magnitude dominates the result—as illustrated on the left side of the number space 65 of FIG. 2—and the size of the accumulator mantissa is less than or equal to the size of the desired result mantissa, then the accumulator may not contribute to the initial round bit or sticky bit calculations. The number space 65 of FIG. 2 designates such cases in which there is no "effective subtraction" as a "Type 3" calculation 85, and such cases in which there is an effective subtraction as a "Type 5" calculation 95. Because the accumulator is effectively aligned to the left of the product mantissa, advantages can be realized by identifying some sticky bits and round bits before adding the accumulator.

There are many advantages to distinguishing situations in which ExpDelta is on the right side of FIG. 2's number line 70 from those in which ExpDelta is on the left side of FIG. 2's number line 70. For instance, conventional FMAs utilize extremely wide alignment shifters—as much as or more than three times the input mantissa widths—to account for calculations for which the accumulator may be aligned to the left or right of the product of the multiplicand and multiplier. By dividing FMA calculations into two sub-operations performed by two modified execution units (a modified multiplier 45 and a modified adder 50), it is possible to utilize a smaller data path and smaller alignment shifters.

For calculations on the right side of the number line 70, the accumulator will have smaller magnitude than the intermediate product vector. Here it is advantageous to add the accumulator to the multiplier product within a modified multiplier 45. For such calculations, a data path width that is approximately one mantissa's width smaller than that of a conventional FMA is sufficient. Because the modified multiplier 45 already has some intrinsic delay, the accumulator is efficiently aligned with the summation tree/array. Normalization and rounding is also simplified. The rounding will be performed in a second FMA sub-operation by a modified adder 50.

For calculations on the left side of the number line 70, by contrast, the accumulator will be the larger operand and may not contribute to rounding. Because the accumulator is not contributing to the rounding (except in the special case discussed next), it is possible to perform some initial sticky collection on the multiplier product, save the intermediate results to memory (e.g., the reorder buffer and/or cache), and sum the accumulator using a modified adder 50. Conventional rounding logic deals effectively with a special case in which the accumulator does contribute to the rounding decision: if there is a sum overflow, the round bit becomes one of the sticky bits, and the LSB of the sum becomes the round bit.

Certain kinds of FMA calculations—a subset of the "effective subtraction" calculations illustrated in the bottom half of the number space 65 of FIG. 2—may result in zeroing out of one or more of the most significant digits. Ordinarily skilled artisans refer to this as "mass cancellation." In FIG. 2, calculations for which there exists a potential for mass cancellation are designated as "Type 1" calculations 75. In such cases, normalization may be required prior to rounding, in order to determine where the round point is. The shifting involved in normalizing a vector may create significant time delays and/or call for the use of leading digit prediction. On the other hand, leading digit prediction can be bypassed for FMA calculations that will not involve mass cancellation.

In summary, the FMA calculations are—as illustrated in FIG. 2—sorted into types based on ExpDelta and EffSub. A first FMA calculation type 75 is defined to include those calculations with ExpDelta in the range {−2,−1, 0, +1} with EffSub being true. These include calculations for which a potential for mass cancellation of bits is addressed. A second FMA calculation type 80 includes calculations with ExpDelta greater than or equal to −1 where EffSub is false. A third FMA calculation type 85 includes those calculations with ExpDelta less than or equal to −2 where EffSub is false.

A fourth FMA calculation type 90 includes those calculations with ExpDelta value greater than {+1} with EffSub being true. A fifth FMA calculation type 95 includes those calculations with ExpDelta less than {−2} with EffSub being true. It will be understood that the designation of types described herein is merely exemplary and that the types could be defined differently. For example, in one implementation, types 2 and 4 could be described as a single unitary type; likewise types 3 and 5 could be described as a single unitary type. Moreover, the dividing lines (shown in dashed lines) between right and left portions of FIG. 2's number line 70 may vary with different implementations.

Fused FMA Instruction Execution Component Set

Figure 3:
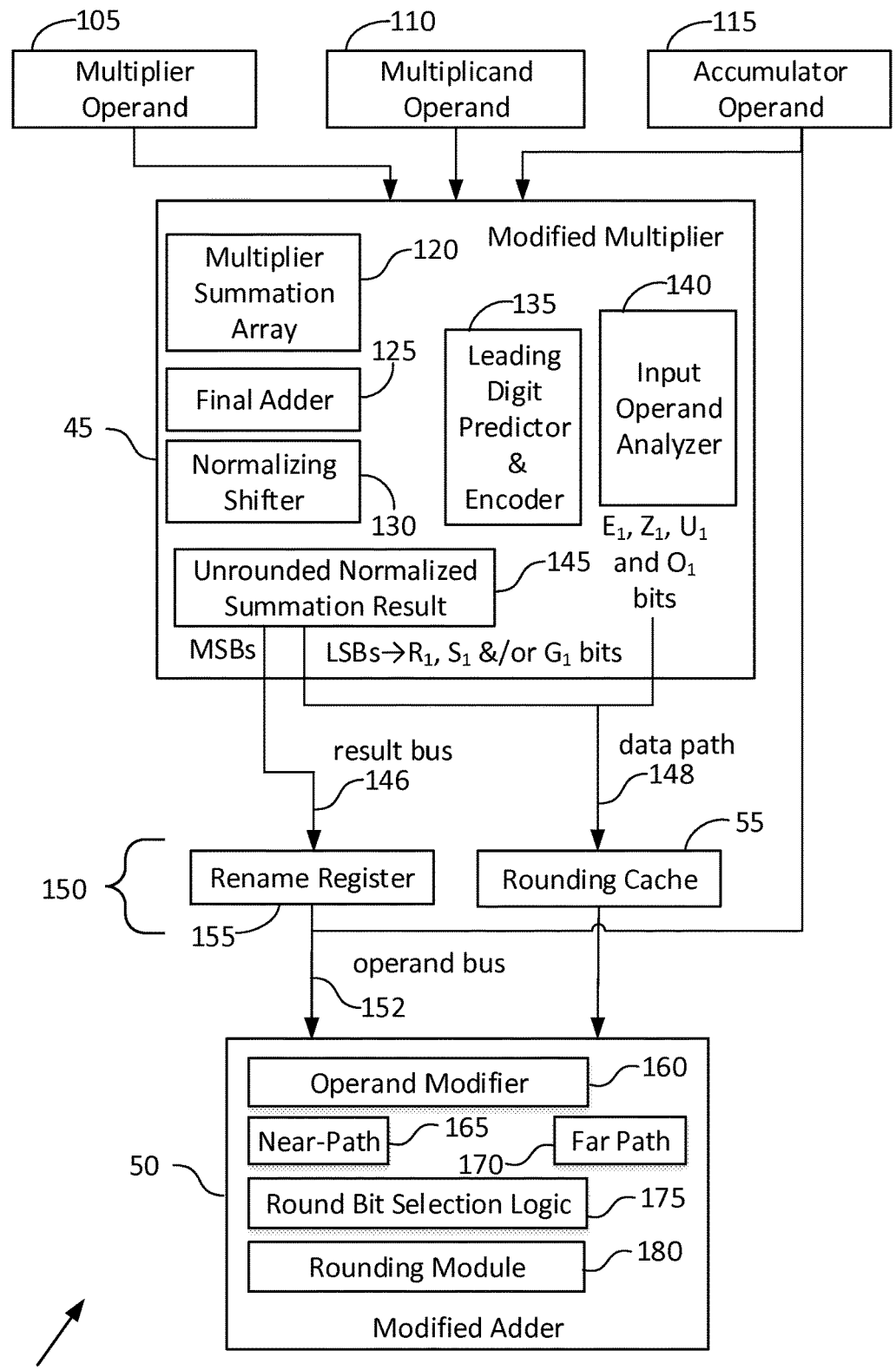
FIG. 3 is a functional block diagram illustrating several logical components of a modified multiplier and modified adder configured to execute FMA calculations.

FIG. 3 provides a generalized illustration of one embodiment of a fused FMA instruction execution component set 100 configured to execute FMA calculations. The component set 100 comprises two physically and/or logically separate arithmetic logic units—in one implementation a modified multiplier 45 and a modified adder 50—and shared storage 155 and 55 for storing a plurality of unrounded intermediate result vectors and rounding indicators.

Each of the modified multiplier 45 and modified adder 50 is an instruction execution unit, and more specifically, an arithmetic processing unit in an instruction pipeline 24 that decodes machine level instructions (e.g., a designated set of instructions in a CISC microarchitecture or a designated set of microinstructions in a RISC microarchitecture), reads its operands from and writes its results to a collection of shared high-speed memory. An instruction execution unit may also be understood as a characteristic set of logic circuitry provided to execute a designated set of machine level instructions intentionally delivered to it for completion, and contrasts with a larger cluster of circuitry (if present) operable to execute multiple machine instructions in a parallel (and not merely pipelined) fashion.

More particularly, the modified multiplier 45 and modified adder 50 are separate, atomic, stand-alone execution units that can decode and operate on microinstructions independently and provide control signals to internal data paths. The shared high-speed memory may be a register file or a set of non-architected computational registers that are provided for microinstructions to exchange data and make its results visible to other execution units.

More particularly, the modified multiplier 45 is a suitable multiply computation unit that may be, in most aspects, conventional in that it can execute ordinary multiply microinstructions that are not part of FMA operations. But it has appropriate modifications to receive the FMA multiplier 105, multiplicand 110, and accumulator 115 as input operands, and to produce a storage format intermediate result 150, as described further below. Likewise, the modified adder 50 is a suitable adder computation unit that may be, in most aspects, conventional in that it can execute ordinary accumulation microinstructions that are not FMA operations, such as add or subtract. But it has appropriate modifications to receive a storage format intermediate result 150 and produce a correct rounded FMA result.

The modified multiplier 45 is capable of performing a first stage or portion of a fused FMA operation (FMA1 sub-operation). The modified multiplier 45 comprises an input operand analyzer 140, a multiplier summation array 120, a final adder 125, a normalizing shifter 130, and a leading digit predictor and encoder 135. When performing the FMA1 sub-operation, the modified multiplier 45 generates and outputs an unrounded normalized summation result 145 and a plurality of rounding bits (or rounding indicators). On the other hand, when performing a non-fused FMA operation, the modified multiplier 45 generates a rounded, IEEE-compliant result.

The rounding bits and the most significant bits (MSBs) of the unrounded normalized summation result 145 are stored in accordance with a storage format. In one implementation, the MSBs of the unrounded normalized summation result 145 are outputted onto a result bus 146 for storage in a rename register 155 having a mantissa width equal to the mantissa width of the target data format. The rounding bits are outputted onto a dedicated rounding bit or calculation control indicator data path or connection network 148 that is external to the modified multiplier and distinct from the result bus 146 for storage in a rounding cache 55 that is distinct from the storage unit (e.g., a reorder buffer 30) storing the rename register 155. The MSBs of the unrounded normalized summation result 145, along with the rounding bits, together comprise a storage format intermediate result 150.

Because the rename registers 155 and rounding cache 55 are part of a shared memory visible to other execution units, the modified adder 50, which is physically and/or logically separate from the modified adder 45, can receive the storage format intermediate result 150 via an operand bus 152 and the rounding bit data path 148 and perform a second (completing) stage or portion of the fused FMA operation (FMA2 sub-operation). Moreover, other unrelated operations can be performed between the FMA1 and FMA2.

The modified adder 50 provides an operand modifier 160 for zeroing out an accumulator operand in FMA situations where the modified multiplier 45 has already performed the necessary accumulation. The modified adder 50 also comprises round bit selection logic 175 for selecting which rounding bits—the rounding bits generated by the modified multiplier 45, or the modified adder 50's internally-generated rounding bits, or some combination of both—to use in the rounding module 180 to produce a final rounded result. The modified adder 50 also includes a near path summation circuit 165 for normalizing sums in cases of mass cancellation of the two accumulation operands, and a far path summation circuit 170 for performing accumulations that produce sums for which no more than a single bit of shifting would be required. As explained further below, FMA2 sub-operations can be handled entirely by the far path summation circuit 170.

Modified Multiplier

Figure 4:
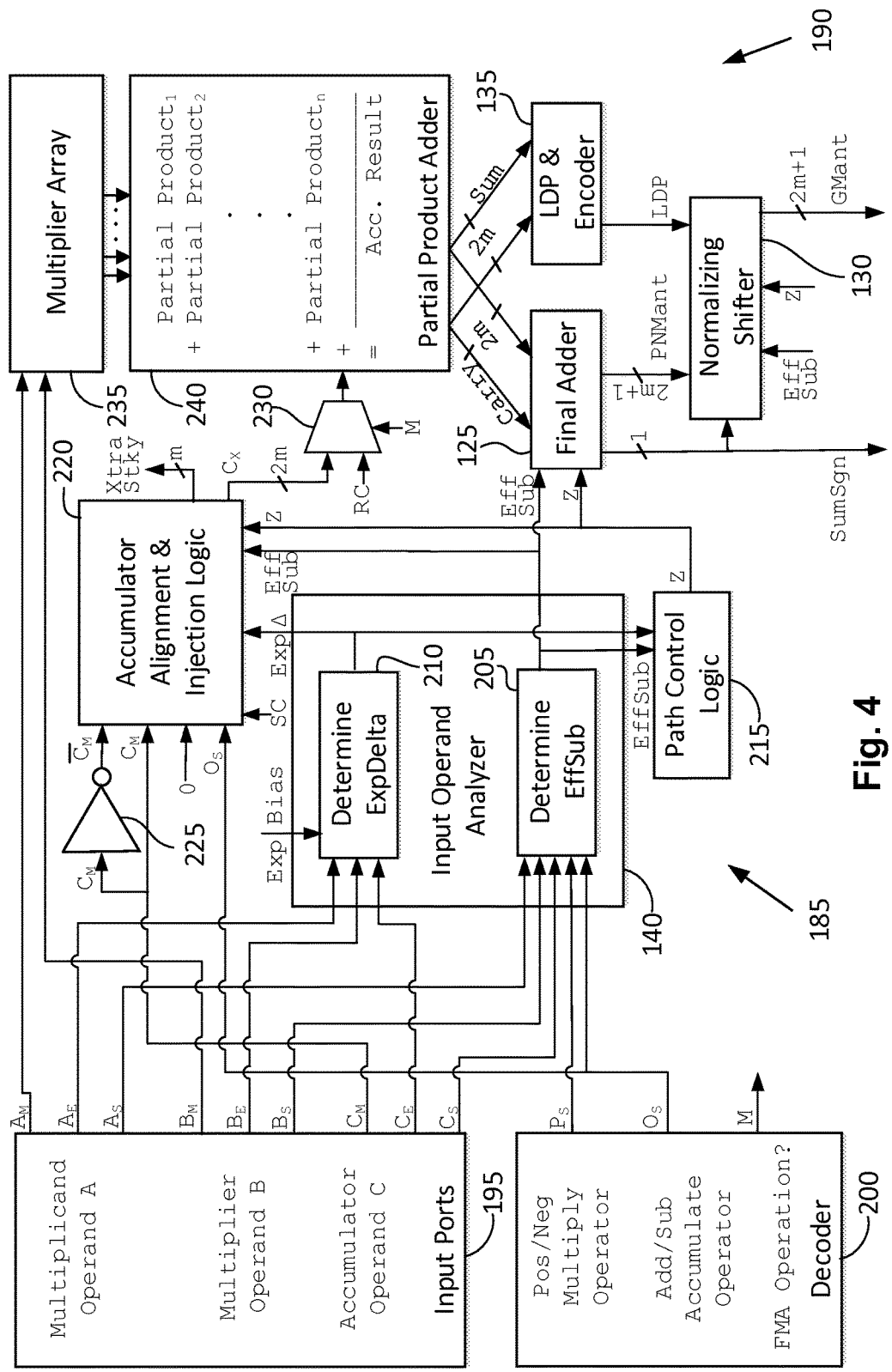
FIG. 4 is a functional block diagram of path-determination logic and a mantissa multiplier module of one embodiment of a multiply computation unit that has appropriate modifications to receive the FMA multiplier, multiplicand, and accumulator as input operands
Figure 5:
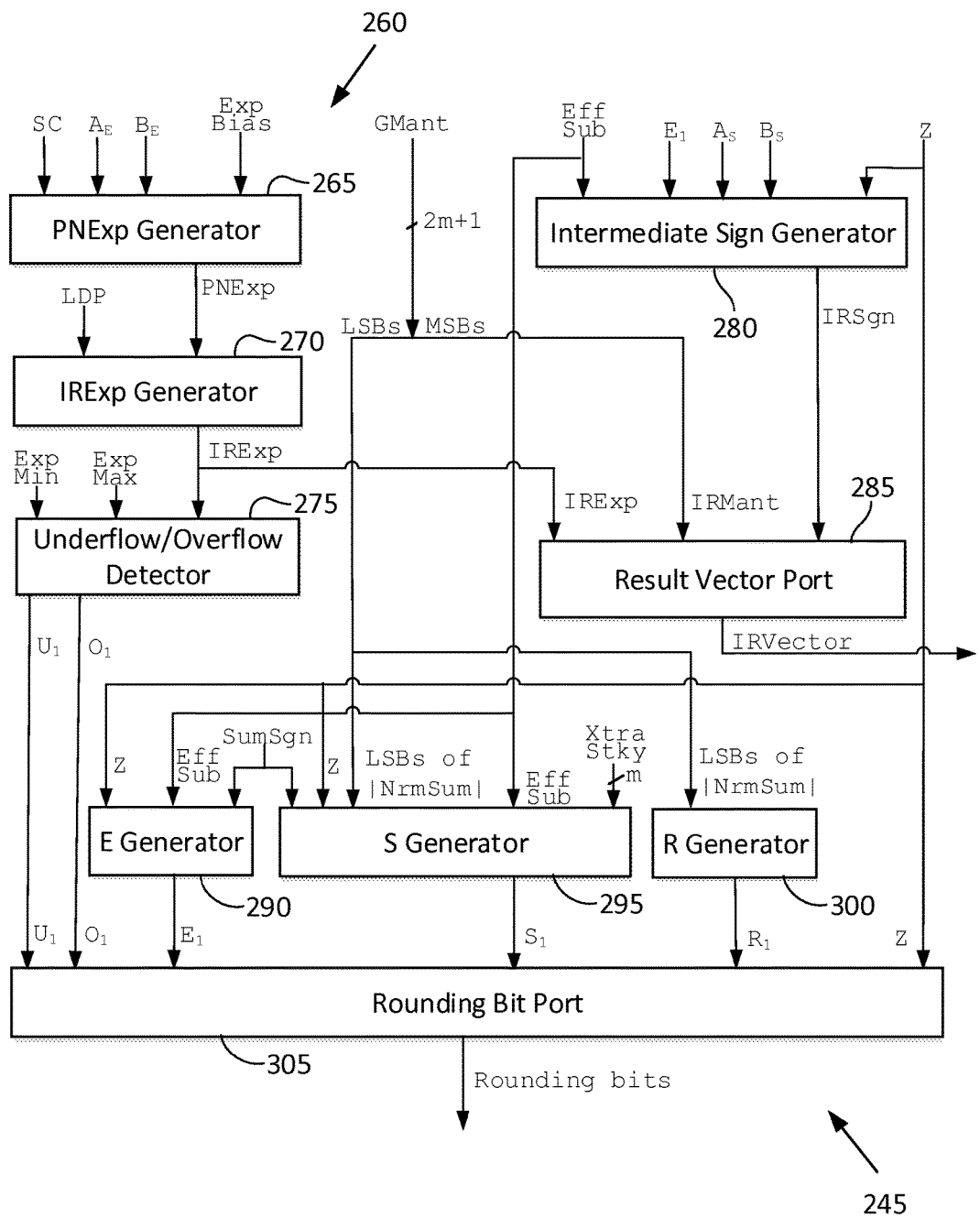
FIG. 5 is a functional block diagram of the exponent result generator and rounding indicator generator of the multiply computation unit partially depicted in FIG. 4, which also has appropriate modifications to produce a storage format intermediate result.

FIGS. 4 and 5 provide a more detailed illustration of one embodiment of the modified multiplier 45. FIG. 4 particularly illustrates path-determination logic 185 and a mantissa multiplier module 190 of the modified multiplier 45. FIG. 5 particularly illustrates the exponent result generator 260 and rounding indicator generator 245 of the modified multiplier 45.

As shown in FIG. 4, the path determination logic 185 comprises an input decoder 200, an input operand analyzer 140, path control logic 215, and an accumulator alignment and injection logic circuit 220. The mantissa multiplier module 190 includes the multiplier summation array 120 of FIG. 3, which is presented in FIG. 4 as two components, a multiplier array 235 and a partial product adder 240. The mantissa multiplier module 190 also comprises a final adder 125, a leading digit predictor and encoder 135, and the normalizing shifter 130.

As shown in FIG. 5, the exponent result generator 260 comprises a PNExp generator 265, an IRExp generator 270, and an underflow/overflow detector 275. The rounding indicator generator 245 comprises an intermediate sign generator 280, a result vector port 285, an end-around carry indicator 290, a sticky bit generator 295, and a round bit generator 300.

Figure 6:
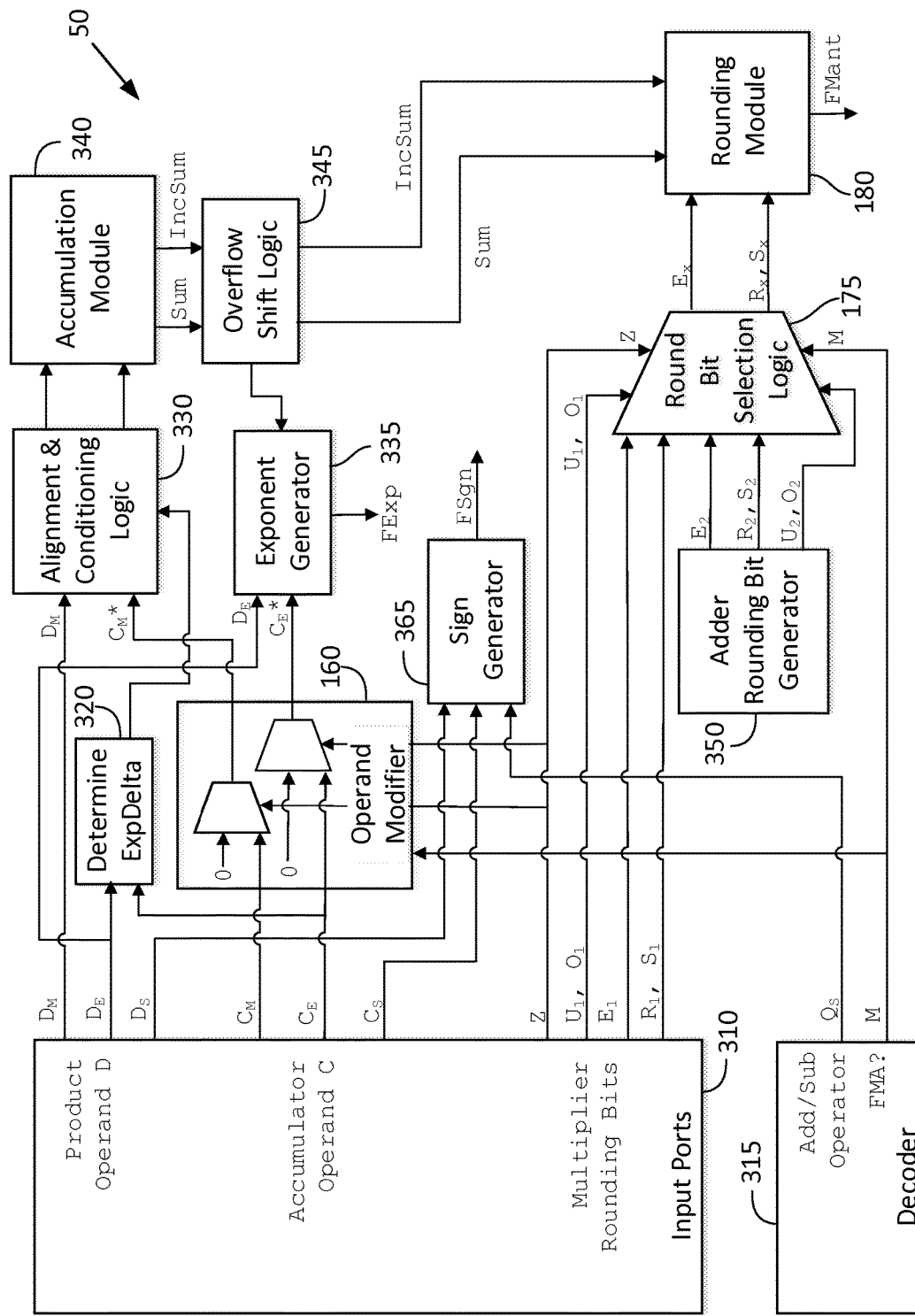
FIG. 6 is a functional block diagram of one embodiment of an adder computation unit that has appropriate modifications to receive a storage format intermediate result and accumulator.

Redirecting attention to FIG. 4, the modified multiplier 45 receives an input microinstruction and operand values through one or more input ports 195. In the case of an FMA microinstruction, the modified multiplier 45 receives a multiplicand operand A, a multiplier operand B, and an accumulator operand C, each of which comprises a sign indicator or bit, a mantissa, and an exponent. In FIGS. 4 and 6, the sign, mantissa, and exponent components of the floating point operands are represented by the subscripts S, M, and E, respectively. So, for example, $A_S$, $A_M$ and $A_E$ represent the multiplicand sign bit, multiplicand mantissa, and multiplicand exponent, respectively.

The decoder 200 decodes the input microinstruction to generate an FMA indicator M and binary operation sign indicators (or bits) $P_S$ and $O_S$. M signifies that the receipt of an FMA microinstruction. In one implementation, an FMA microinstruction of the form A*B+C results in generation of a positive multiply/vector negative multiply sign operator $P_S$ of binary zero and an add/subtract operator $O_S$ of binary zero. A negative multiply-add microinstruction of the form –A*B+C results in a $P_S$ of binary one and an $O_S$ of binary zero. A multiply-subtract microinstruction of the form A*B–C results in a $P_S$ of binary zero and an $O_S$ of binary one, and a vector negative multiply-subtract microinstruction of the form –A*B–C results in a $P_S$ and $O_S$ of binary one. In other, simpler implementations, the modified multiplier 45 does not directly support vector negative microinstructions and/or subtract microinstructions, but the microprocessor 10 supports equivalent operations by first additively inverting one or more operands, or sign indicators, as appropriate, before dispatching a multiply add/subtract microinstruction to the modified multiplier 45.

The multiplier array 235 receives the multiplicand and multiplier mantissa values $A_M$ and $B_M$ and computes partial products of $A_M$ and $B_M$. (It will be understood that if the absolute value of either of $A_M$ and $B_M$ are one or zero, then the multiplier array 235 may produce a single "partial product" value which would constitute the complete product of $A_M$ and $B_M$. The partial products are supplied to the partial product adder 240, which provides a plurality of entries for receiving these partial products of A and B in preparation for summing them. At least one of the entries in the partial product adder 240 is configured to receive an accumulator-derived value $C_X$. Additional description of the partial product adder 240 resumes below after discussion of the input operand analyzer 140 and accumulator alignment and injection logic 220.

The input operand analyzer 140 comprises an ExpDelta analyzer subcircuit 210 and an EffSub analyzer subcircuit 205. The ExpDelta analyzer subcircuit 210 generates the ExpDelta (ExpΔ) value. In one implementation, ExpDelta is calculated by summing the multiplier and multiplicand input exponent values $A_E$ and $B_E$, subtracting an addend or subtrahend input exponent value $C_E$, and subtracting an exponent bias value ExpBias, if any. Introducing the ExpBias value corrects for the fact that when $A_E$, $B_E$ and $C_E$ are represented using biased exponents as, for instance, required by IEEE 754, the product of multiplicand A and multiplier B will have twice as much bias as the accumulator C.

The EffSub analyzer subcircuit 205 analyzes the operand sign indicators $A_S$, $B_S$ and $C_S$ and operator sign indicators $P_S$ and $O_S$. The EffSub analyzer subcircuit 205 generates an "EffSub" value that indicates whether the FMA operation will be an effective subtraction. For example, an effective subtraction will result if the operator-specified addition or subtraction of C to the product of A and B (or the negative thereof for a negative vector multiply operator) would yield a result R that has an absolute magnitude that is less than (a) an absolute magnitude of the product of A and B, or (b) the absolute magnitude of C. Expressed with mathematical notation, an FMA operation will constitute an effective subtraction if (|R|<|A*B|) V (|R|<|C|), where R is the result of the FMA operation. While it is convenient to describe EffSub in terms of the result of the FMA operation, it will be understood that the EffSub analyzer subcircuit 205 predetermines EffSub by analyzing the sign indicators $A_S$, $B_S$, $C_S$, $P_S$ and $O_S$, without evaluating the mantissas, exponents or magnitudes of A, B and C.

The path control logic 215 receives the ExpDelta and EffSub indicators generated by the input operand analyzer 140 and, in response, generates a path control signal, the value of which is herein referred to by the variable Z. The path control signal Z controls whether accumulation of C will be performed within the modified multiplier 45 along with partial products of A and B. In one implementation, the criteria the path control logic 215 uses to generate Z is set forth in FIG. 2. In one implementation, Z is a binary one for all cases in which the modified multiplier 45 is selected to perform the accumulation portion of the multiply-add operation (e.g., Types 1, 2 and 4) and a binary zero for all other combinations of ExpDelta and EffSub (e.g., Types 3 and 5).

Alternatively, a criterion the path control logic 215 may use to generate Z is whether C has a magnitude, relative to a magnitude of the product of A and B, that enables C to be aligned in the summation tree without shifting the most significant bit of C to the left of most significant bit provided within the summation tree for the partial product summation of A and B. Another or alternative criterion is whether there is a potential for mass cancellation in performing the FMA operation. Yet another or alternative criterion is whether the accumulation of C to a product of A and B would generate an unrounded result R requiring fewer bits than needed to align C with the product of A and B. Thus it will be understood that the path control criteria may vary depending on the design of the modified multiplier 45.

The accumulator alignment and injection logic 220 circuit receives Z generated by the path control logic 215, ExpDelta generated by the ExpDelta analyzer subcircuit 210, a shift constant SC, and the accumulator mantissa value $C_M$. In one implementation, the accumulator alignment and injection logic 220 also receives $C_M$'s bitwise negation, $\overline{C_M}$, and the add/subtract accumulate operator indicator $O_S$. In another implementation, accumulator alignment and injection logic 220 selectively additively inverts $C_M$ if the add/subtract accumulate operator indicator $O_S$ indicates that the microinstruction received by the modified multiplier 45 is a multiply-subtract microinstruction.

In response to these inputs, the accumulator alignment and injection logic 220 circuit produces a value $C_x$ to inject into the partial product adder 240. The width of the array holding $C_x$ is 2 m+1 or two times the width of the input operand mantissas $A_M$, $B_M$ and $C_M$ plus one additional bit.

If M is a binary zero, indicating that the modified multiplier 45 is performing an ordinary multiply operation rather than an FMA1 sub-operation, then a multiplexer 230 injects a rounding constant RC, instead of $C_X$, into the partial product adder 240 so that the modified multiplier 45 can generate a rounded result in a conventional fashion. The value of the RC depends in part on a type of rounding (e.g., round half up, round half to even, round half away from zero) indicated by the instruction, and also on the bit size (e.g., 32 bit versus 64 bit) of the input operands. In one implementation the partial product adder 240 computes two sums, using two different rounding constants, and then selects an appropriate sum. The IMant output of the modified multiplier 45 thereby becomes a correctly rounded mantissa result of the ordinary multiply operation.

If M is a binary one and Z is a binary zero, indicating that no accumulation of C should be performed by the partial product adder 240, then, in one implementation, the accumulator alignment and injection logic 220 circuit sets $C_X=0$, causing the multiplexer 230 to inject zeroes into a partial product adder 240 array provided for receiving a value of $C_X$. If M is a binary one and Z is a binary one, then the accumulator alignment and injection logic 220 right shifts $C_M$ by an amount equal to ExpDelta plus a shift constant SC, producing $C_X$. In one implementation, shift constant SC is equal to 2, which corresponds to largest negative ExpDelta in the number space of FIG. 2 in which accumulation with C is performed in the modified multiplier 45. The multiplexer 230 then injects the resulting $C_X$ into the partial product adder 240.

The accumulator alignment and injection logic 220 also incorporate a sticky collector. Any portion of accumulator $C_X$ that is shifted beyond the least significant bit (LSB) of the partial product adder 240 summation tree is retained as XtraStky bits for use in rounding. Because as many as m bits may be shifted beyond the LSB of the partial product adder 240, the XtraStky bits are forwarded as an m-wide extra sticky bit array for use in calculating sticky bit S.

Turning attention back to the modified multiplier 45's summation logic, the partial product adder 240 is in some implementations a summation tree, and in one implementation one or more carry-save adders. The partial product adder 240 performs a summation to an unrounded, redundant representation or sum, per the carry-save vectors on the bit columns within the provided partial product summation tree, in accordance with methods typical of prior art multiply execute units, including this additional selectively bitwise negated, aligned, accumulator input value in the summation of partial products.

Again, it will be appreciated that the mathematical operation performed by the partial product adder 240 depends on the value of Z. If Z=1, then the partial product adder 240 performs a joint accumulation of $C_x$ with the partial products of $A_M$ and $B_M$. If Z=0, then the partial product adder 240 performs a primary accumulation of the partial products of $A_M$ and $B_M$. As a result of the primary or joint accumulation, the partial product adder 240s produces a redundant binary sum represented as a 2 m bit sum vector and a 2 m bit carry vector.

The carry and sum vectors are forwarded to both a final adder 125 and a leading digit predictor and encoder 135. The final adder 125, which may be a carry-lookahead adder or a carry propagate adder, completes the summation process by converting the carry and sum vectors into a positive or negative prenormalized unrounded nonredundant sum PNMant having a width of 2 m+1. The final adder 125 also generates a sum sign bit SumSgn that indicates whether PNMant is positive or negative.

In parallel with and during the same time interval the final adder 125 generates PNMant, the leading digit predictor and encoder 135 anticipates the number of leading digits that will need to be cancelled to normalize PNMant. This arrangement provides an advantage over prior art split multiply-add FMA designs in which the final addition with a final adder 125 is done after the normalization, which requires normalization of both the carry vector and the sum vector, which in turn must wait for the output of the leading digit prediction. In a preferred implementation, the leading digit predictor and encoder 135 accommodates either positive or negative sums.

In one implementation, leading digit prediction is only performed for Type 1 calculations. The chosen method of leading digit prediction accommodates either positive or negative sums, as previously described, and as would be understood by those reasonably skilled in the practice of floating point computational design.

Because the leading digit predictor and encoder 135 may have up to one bit of inaccuracy, any of several customary techniques to correct for this may be provided in or in relation to the normalizing shifter 130. One approach is to provide logic to anticipate this inaccuracy. Another approach is to examine whether the MSB of the PNMant is set or not, and responsively select an additional shift of the PNMant.

The normalizing shifter 130 receives the unrounded nonredundant sum PNMant from the final adder 125 and generates a germinal mantissa value GMant. In cases where accumulation with $C_X$ has been performed using the partial product adder 240, GMant is the absolute normalized sum of $C_X$ and the product of $A_M$ and $B_M$. In all other cases, GMant is the absolute normalized sum of the product of $A_M$ and $B_M$.

To produce GMant, the normalizing shifter 130 bitwise negates PNMant if SumSgn indicates that PNMant is negative. The normalizing shifter 130's bitwise negation of negative PNMant values is useful in generating a storage format intermediate result 150, as described further below. It is also useful in facilitating correct rounding. By inverting PNMant in the modified multiplier, it can be provided as a positive number to the modified adder without communicating that it was a negative number. This allows the accumulation to be implemented as a sum and rounded in a simplified manner.

Furthermore, the normalizing shifter 130 left shifts PNMant by an amount that is a function of LDP, EffSub and Z. It is noted that even if no cancellation of most significant leading digits occurs, a left shift of PNMant by zero, one, or two bit positions may be needed to produce a useful, standardized storage format intermediate result 150 and to enable correct subsequent rounding. The normalization, consisting of a left shift, brings the arithmetically most significant digit to a standardized leftmost position, enabling its representation in the storage format intermediate result 150 described further herein below.

This implementation realizes three additional advantages over prior art FMA designs. First, it is not necessary to insert an additional carry bit into the partial product adder 240, as would be required if two's complement were performed on the accumulator mantissa in response to EffSub. Second, it is not necessary to provide a large sign bit detector/predictor module to examine and selectively complement the redundant sum and carry vector representations of the nonredundant partial product and accumulator summation value. Third, it is not necessary to provide additional carry bit inputs to ensure correct calculation for such selectively complemented sum and carry vector representation of the partial product and accumulator summation.

Turning now to the exponent result generator 260 of FIG. 5, the PNExp generator 265 generates a prenormalized exponent value PNExp as a function of the multiplicand and multiplier exponent values $A_E$ and $B_E$, the exponent bias ExpBias, and the shift constant SC. More particularly in one implementation, the PNExp is calculated as the shift constant SC plus $A_E+B_E-$ExpBias.

The IRExp generator 270 decrements the PNExp to account for the normalization of the mantissa performed by the normalizing shifter 130, generating an intermediate result exponent IRExp that is a function of the PNExp and the leading digit prediction LDP. The IRExp is then forwarded to the result vector port 280, described further below.

The intermediate sign generator 280 generates intermediate result sign indicator IRSgn as a function of EffSub, E, $A_S$, $B_S$, and Z. More particularly in one implementation, IRSgn is in some cases calculated as the logical exclusive-or (XOR) of the multiplicand sign bit $A_S$ and the multiplier sign bit $B_S$. But if the Z bit is a binary one, indicating accumulation has been performed, EffSub is also a binary one, indicating an effective subtraction, and the E bit value is a binary zero, indicating that no end-around carry is pending, then IRSgn is advantageously calculated as the logical exclusive-nor (XNOR) of the multiplicand sign bit As and the multiplier sign bit $B_S$. Stated another way, the intermediate sign is generally the sign of the product of A and B. The sign of the product of A and B is reversed when the accumulator has a greater magnitude than the product of A and B, the multiply-add operation is an effective subtraction, and completion of the accumulation does not require an end-around carry (because the accumulation is negative).

The intermediate result sign indicator IRSgn contributes to an innovative method for determining the final sign bit for FMA calculations in which mass cancellation is a possibility. Unlike prior art split-path FMA implementations, the implementation described herein does not require sign prediction and does not require the considerable circuitry employed in predicting the sign. Alternately, a sign of zero result, or a sign of a result from a calculation with signed zero inputs may be easily precomputed, incorporating, for example, a rounding mode input.

The result vector port 280 outputs a storage format intermediate result vector IRVector comprising the intermediate result exponent IRExp, an intermediate result sign IRSgn, and an intermediate result mantissa IRMant. In one implementation of the storage format, IRMant comprises the most significant m bits of GMant, where m is the width of the target data type. For example, in IEEE double double precision calculations, the result vector port 280 outputs IRVector as a combination of a single sign bit, eleven exponent bits, and the most significant 53 bits of GMant. In another implementation of the storage format, m is equal to the width of the mantissa values $A_M$, $B_M$, and $C_M$. In yet another implementation, m is larger than the width of the mantissa values $A_M$, $B_M$, and $C_M$.

The single most significant of these mantissa bits may assume an implied value when stored, analogous to IEEE standard storage format. IRVector is saved to a shared memory such as a rename register 155 of the ROB 30, so that it can be accessed by other instruction execution units, and/or forwarded on a result forwarding bus 40 to another instruction execution unit. In a preferred implementation, IRVector is saved to a rename register 155. Moreover, the intermediate result vector is given an unpredictable assignment in the ROB, unlike architectural registers, which may be given a permanent assignment in the ROB 30. In an alternative implementation, IRVector is temporarily saved to a destination register in which the final, rounded result of the FMA operation will be stored.

Turning now to the rounding indicator generator 245 of FIG. 5, the underflow/overflow detector 275 generates underflow indicator $U_1$ and overflow indicator $O_1$ as a function of the IRExp and exponent range values ExpMin and ExpMax, which correspond to the precision of the storage format intermediate result 150 (discussed further below) or the target data type. If the IRExp is less than the range of representable exponent values for target data type of this FMA calculation, or less than the range of representable exponent values for any intermediate storage such as a rename register, a $U_1$ bit is assigned binary one. Otherwise, a $U_1$ bit is assigned binary zero. Contrariwise, if the IRExp is greater than the range of representable exponent values for target data type of this FMA calculation, or greater than the range of representable exponent values for any intermediate storage such as a rename register, the $O_1$ bit is assigned binary one. Otherwise, the $O_1$ bit is assigned binary zero. Alternatively, U & O may be encoded to represent 4 possible exponent ranges, at least one of which encodings would represent underflow, and at least one of which would represent overflow.

The $U_1$ and $O_1$ bits would, in a conventional implementation of an ordinary multiplier unit, be reported to exception control logic. But when executing an FMA1 sub-operation, the modified multiplier 45 outputs the $U_1$ and $O_1$ bits to intermediate storage to be processed by a modified adder 50.

The end-around-carry indicator generator 290 generates the pending end-around carry indicator $E_1$ bit as a function of Z, EffSub, and SumSgn. The $E_1$ bit is assigned a binary one if the previously determined Z bit has a binary value of one, which indicates that the partial product adder 240 has performed an accumulation with C, the previously determined EffSub variable indicates the accumulation resulted in an effective subtraction, and a positive unrounded nonredundant value PNMant was produced, as indicated by SumSgn. In all other cases, $E_1$ is assigned a binary zero.

While the result vector port 280 stores the most significant bits of GMant as the intermediate result mantissa of the intermediate result vector, the sticky bit generator 295 and round bit generator 300 reduce the remaining bits of lesser significance (e.g., beyond the 53rd bit of intermediate result mantissa) to round ($R_1$) and sticky ($S_1$) bits. The sticky bit generator 295 generates the sticky bit $S_1$ as a function of SumSgn, Z, the least significant bits of GMant, EffSub, and the XtraStky bits. The round bit generator 300 generates a round bit $R_1$ as a function of the least significant bits of GMant.

Rounding Cache

The rounding bit port 305 outputs each of bits $U_1$, $O_1$, $E_1$, $S_1$, $R_1$ and Z so that they can be subsequently used by another instruction execution unit (e.g., the modified adder 50) to generate a final, rounded result of the FMA operation. For convenience, all of these bits are referred to herein as rounding bits even though some of the bits may serve other purposes in producing a final output of the FMA operation, and even if not all of the bits are used for rounding. For example, in some implementations, the $O_1$ bit might not be used in rounding. These bits may be interchangeably referred to as calculation control indicators. The bits Z and E, for example, indicate what further calculations need to be done. U and 0, for example, indicate how those calculations should proceed. Yet further, the bits may be referred to as calculation intermission state values because they provide a compact format for representing and optionally storing calculation state information in the intermission between the modified multiplier 45's FMA1 sub-operation and the modified adder 50's FMA2 sub-operation.

Together with the intermediate result vector and the accumulator value C, the bits, whether called rounding bits, calculation control indicators, calculation state indicators, or something else, provide everything the subsequent instruction execution unit needs, in addition to its operand values, to produce the arithmetically correct, final result. Stated another way, the combination of the intermediate result vector and rounding bits provides everything that is needed to produce an arithmetically correct representation of the result of the FMA operation, one that is indistinguishable from a result generated from an infinitely precise FMA calculation of ±A*B±C that is reduced in significance to the target data size.

In keeping with a preferred aspect of the invention, the microprocessor 10 is configured to both store the rounding bits in a rounding cache 55, which may be alternatively referred to as a calculation control indicator store, and forward the rounding bits on a forwarding bus 40 to another instruction execution unit. In one alternative implementation, the microprocessor 10 does not have a rounding cache 55, and instead merely forwards rounding bits on a forwarding bus 40 to another instruction execution unit. In yet another alternative implementation, the microprocessor 10 stores the rounding bits in a rounding cache 55, but does not provide a forwarding bus 40 to directly forward the rounding bits from one instruction execution unit to another.

Both the rounding cache 55 and the rounding bits or calculation control indicators it stores are non-architectural, meaning that they are not end-user programmer visible, in contrast to architectural registers and architectural indicators (such as the floating point status word), which are programmer visible signal sources that are specified as part of an instruction set architecture (ISA).

It will be appreciated that the particular set of rounding bits described herein is exemplary, and that alternative implementations generate alternative sets of rounding bits. For example, in one alternative implementation, the modified multiplier 45 also comprises a guard-bit generator that generates a guard bit $G_1$. In another implementation, the modified multiplier 45 also pre-calculates the sign of a zero result, saving the value to the rounding cache. If the modified adder 50's subsequent calculations result in a zero result, the modified adder 50 uses the saved zero result sign indicator to generate the final signed zero result.

In keeping with another preferred aspect of the invention, the rounding cache 55 is a memory storage that is external to the modified multiplier 45. However, in an alternative implementation, the rounding cache 55 is incorporated into the modified multiplier 45.

More particularly, the rounding cache 55 is, in one implementation, coupled independently from the result bus to the instruction execution unit. Whereas the result bus conveys results from the instruction execution unit to a general purpose storage, the rounding cache 55 is coupled independently of the result bus 55 to the instruction execution unit. Moreover, the calculation control indicator storage may be accessible only to instructions operable to store or load a calculation control indicator. Accordingly, the rounding cache 55 is accessed by a different mechanism—for example, through its own set of wires—than through the result bus to which instruction results are output. The rounding cache 55 is also accessed through a different mechanism than through the input operand ports of the instruction execution unit.

In one implementation, the rounding cache 55 is a fully-associative, content accessible memory with as many write ports as the maximum number of FMA1 microinstructions that can be dispatched in parallel, as many read ports as the maximum number of FMA2 microinstructions that can be dispatched in parallel, and a depth (number of entries) that relates to the capacity of the instruction scheduler and the maximum period of time (in clock cycles) that can elapse after an FMA1 microinstruction is dispatched before the instruction scheduler dispatches a corresponding FMA2 microinstruction. In another implementation, the rounding cache 55 is smaller, and the microprocessor 10 is configured to replay an FMA1 microinstruction if space within the rounding cache 55 is not available to store the rounding bit results of the FMA1 microinstruction.

Each entry of the cache provides for the storage of the cache data as well as a tag value related to the cache data. The tag value may be the same tag value used to identify the rename register 155 storing the storage format intermediate result vector. When the microprocessor 10 is preparing/fetching operands for the second microinstruction, it uses the ROB index to retrieve the stored intermediate data from the rename registers 155 and that very same index will be provided to the rounding cache 55 and supply the remaining portion of the intermediate result 150 (i.e., the calculation control indicators).

Advantageously, a significantly smaller amount of physical storage entries may be allocated to the rounding cache 55 than is allocated to the rename registers 155. The number of rename registers 155 is a function of the number of microinstructions in flight and the number of register names needed to keep the execution units saturated in an out-of-order microprocessor or design. By contrast, the desirable number of rounding cache 55 entries may be made a function of the likely number of FMA microinstructions in flight. So, in one non-limiting example, a microprocessor core may provide sixty-five rename registers 155 but only eight rounding cache 55 entries to serve up to eight arithmetic computations in parallel.

An alternative implementation extends the rename registers 155 (i.e., make the rename registers wider) used to store the intermediate result vector to provide extra bits for the rounding cache 55 data. This is a potentially suboptimal use of space, but still within the scope of the present invention.

The rounding bits, along with the intermediate result vector IRVector, together comprise the storage format intermediate result 150. This described storage format, which saves and/or forwards the most significant bits (one of which has implied value) of the unrounded normalized summation result 145 according to a standardized data format and saves and/or forwards the remaining (reduced or unreduced) bits of the unrounded normalized summation result 145 along with $E_1$, $Z$, $U_1$, and $O_1$ bits, provides significant advantages over the prior art.

Modified Adder

Turning now to FIG. 6, the modified adder 50 comprises an operand modifier 160, alignment and conditioning logic 330, and a far path accumulation module 340 paired with single-bit overflow shift logic 345. The operand modifier 160 also comprises an exponent generator 335, a sign generator 365, an adder rounding bit generator 350, round bit selection logic 175, and a rounding module 180.

It should be noted that in one implementation, the modified adder 50 provides a split path design allowing computation of near and far calculations separately, as would be understood by those reasonably skilled in the practice of floating point computational design. The near path computation capability would comprise a near path accumulation module (not shown) paired with a multi-bit normalizing shifter (not shown), but that such a capability is not illustrated in FIG. 6. In one implementation, ordinary accumulations of operands C and D that constitute effective subtractions for which the difference of input exponent values is in the set {−1, 0, +1} would be directed to the near path 165. All other add operations would be directed to the far path 170. Advantageously, the present invention enables all FMA2 sub-operations in the modified adder 50 to be directed to the far path 170.

The modified adder 50 provides one or more input ports 310 to receive a microinstruction and two input operands. The first input operand D is a minuend or a first addend. The second operand C is a subtrahend or a second addend. In a floating-point implementation, each input operand includes an input sign, an exponent, and a mantissa value, denoted by subscripts S, E and M, respectively. A decoder 315 interprets the microinstruction to indicate, using signal $Q_S$, whether the operation is an addition or a subtraction. The decoder further interprets the microinstruction (or an operand reference specified by the microinstruction) to indicate, with signal M, whether the microinstruction dictates a specialized micro-operation in which the modified adder 50 is to perform an FMA2 sub-operation.

When the modified adder 50 is tasked with performing an FMA2 sub-operation, the modified adder 50 receives an intermediate result vector IRVector, which was previously generated by a modified multiplier 45 that performed the corresponding FMA1 sub-operation. Because the intermediate result vector IRVector is only m bits in width, the modified adder 50 need not be, and in one implementation is not, modified to accept or process significands wider than m-bits. Accordingly, the internal datapaths, accumulation module 340 and other circuits of the modified adder 50 are simpler and more efficient than they would need to be were IRVector presented in a wider format. Also, because accumulations involving a potential for mass cancellation are done by the modified multiplier 45, no rounding logic must be added to the near/mass cancellation path of the modified adder 50 to correctly calculate the FMA result.

In one implementation, the modified adder 50 receives IRVector from a rename register 155. In another implementation, IRVector is received from a forwarding bus 40. In the implementation illustrated in FIG. 6, IRVector would be received as operand D. The modified adder 50 receives, as its other operand, the accumulator value C.

If M indicates that the modified adder 50 is tasked with performing the FMA2 sub-operation, then the operand modifier 160 causes a part of one input operand to be set equal to binary zero when Z is a binary one, indicating that accumulation of C has been performed with the modified multiplier 45. In one implementation, each of the exponent, mantissa, and sign fields $C_E$, $C_M$ and $C_S$ are modified to zero. In another implementation, only exponent and mantissa fields $C_E$ and $C_M$ are modified to binary zero, while the operand sign Cs is retained. As a consequence, the modified adder 50 sums addend D with a binary signed zero.

A binary one M bit also signals the modified adder 50 to receive the rounding bits generated by the modified multiplier 45 and incorporated into the storage format intermediate result 150.

In all other cases—i.e., if Z is a binary zero or if M is binary zero, indicating that the modified adder 50 is tasked with a conventional accumulation operation—then the operand modifier 160 does not modify the exponent and mantissa fields $C_E$ and $C_M$ other than what may be necessary for conventional floating point addition.

In one implementation, the operand modifier 160 comprises a pair of multiplexers which receive the value of Z to select between $C_M$ and zero and between $C_E$ and zero. The selected values are represented as $C_M^*$ and $C_E^*$ on FIG. 6. The alignment and conditioning logic 330 then aligns and/or conditions the selected value $C_M^*$ and the first operand mantissa $D_M$.

Next, the far path accumulation module 340 sums $C_M^*$ and $D_M$. In one implementation, the accumulation module 340 is a dual sum adder providing sum and incremented sum. Also in one implementation, the accumulation module 340 is operable to perform effective subtractions using one's complement methodology. If the sum produces a one bit overflow in the mantissa field, then the overflow shift logic 345 conditionally shifts the sum by one bit, readying the resulting value for rounding.

The exponent generator 335 generates a final exponent FExp using the selected exponent value $C_E^*$, the first operand exponent $D_E$, and a shift amount produced by the overflow shift logic 345.

The sign generator 365 generates a final sign FSgn as a function of the first and second operand signs $C_S$ and $D_S$, the add/subtract operator Qs and the sign of the summation result.

In another implementation, not shown, the operand modifier 160 is replaced with selector logic that causes the first operand D to be forwarded directly to the rounding module 180, while holding the summation logic in a quiescent state, when the input decoder indicates that the adder is performing an FMA2 sub-operation and Z is binary one, indicating that accumulation with C has already been performed.

Logic within the modified adder 50 generates its own set of rounding bits $R_2$, $S_2$, $U_2$, $O_2$ and $E_2$. When M indicates that the modified adder 50 is tasked with performing an FMA2 sub-operation, the modified adder 50 also receives a plurality of rounding bits $R_1$, $S_1$, $U_1$, $O_1$, Z and $E_1$ previously generated by the modified multiplier 45 that performed the FMA1 sub-operation.

For cases in which M is a binary one, round bit selection logic 175 determines whether rounding bits $E_1$, $R_1$ and $S_1$ from the modified multiplier 45, rounding bits $E_2$, $R_2$ and $S_2$ from the modified adder 50, or some mix or combination of the two will be used by the adder's rounding module 180 to generate a final, rounded mantissa result. For example, if the operation being performed is not an FMA2 sub-operation (i.e., M=0), then the rounding module 180 uses the adder-generated rounding bits $E_2$, $R_2$ and $S_2$. Alternatively, if accumulation was done with the modified multiplier 45 (i.e., M=1 and Z=1), and there was no underflow (i.e., $U_M$=0), then the selected multiplier-generated rounding bits $E_1$, $R_1$ and $S_1$ provide everything that is needed by the rounding module 180 to produce a final rounded result.

The variable position rounding module 180 is provided as part of the far computation capability of the modified adder 50 and, in one implementation, accommodates the rounding of positive differences resulting from one's complement effective subtractions and additionally and differently accommodates the rounding of positive sums resulting from additions that are not effective subtractions. The rounding module 180 processes the selected round bit $R_x$, sticky bit $S_x$, and—if provided—guard bit $G_x$ (not shown) in a manner similar to the manner in which conventional unitary add/subtract units process such bits. The rounding module 180 is, however, modified from conventional designs to accept at least one supplementary input, namely, the selected end-around carry bit $E_x$, which may indicate that an end around carry correction is needed if a one's complement effective subtraction was performed by the modified multiplier 45. Using the selected $R_x$, $S_x$, and $E_x$ inputs, the rounding module 180 correctly rounds the sum of the intermediate result vector and signed zero to produce a correct and IEEE-compliant result, as would be understood by those reasonably skilled in the practice of floating point computational design.

As noted above, the modified adder 50 may need the near path 165 to perform certain types of conventional accumulation operations, but it does not need the near path 165 to perform FMA operations described herein. Therefore, when performing FMA operations of a type described herein, the near path logic 165 may be held in a quiescent state to conserve power during FMA calculations.

First and Second FMA Sub-operations

FIGS. 7-10 illustrate one embodiment of a method of performing a non-atomic split path multiply-accumulate calculation using a first FMA sub-operation (FMA1) and a subsequent second FMA sub-operation (FMA2), wherein the FMA2 sub-operation is neither temporally nor physically bound to the first FMA1 sub-operation.

Figure 7:
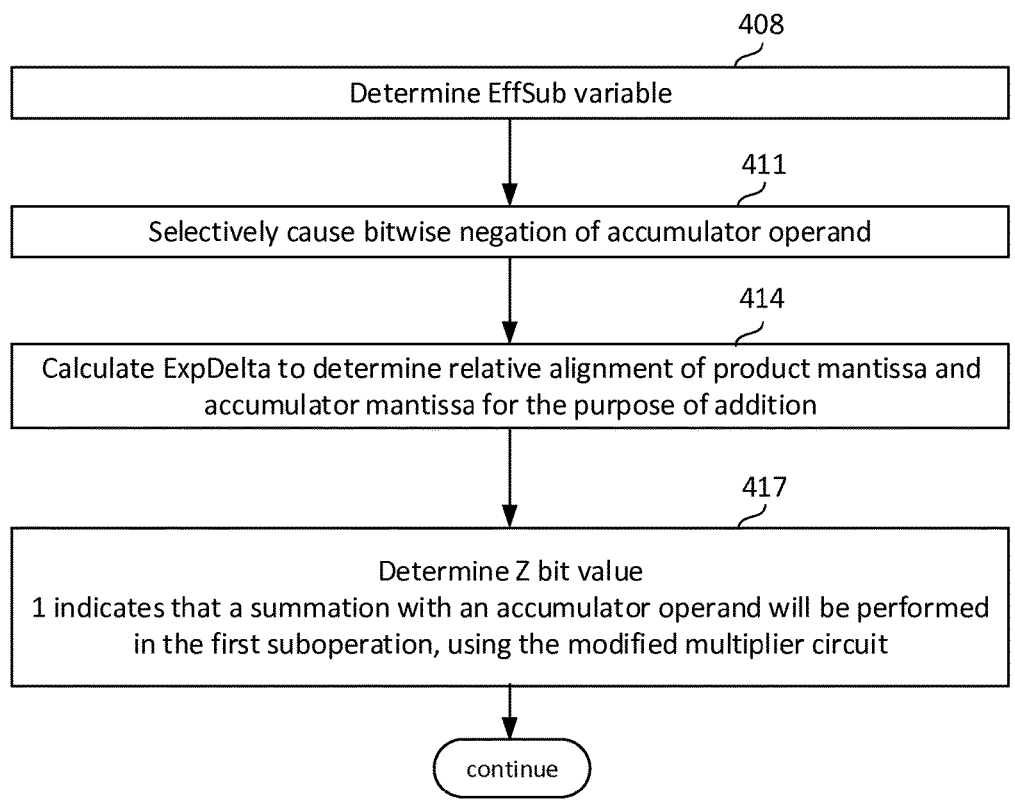
FIG. 7 is a functional block diagram illustrating a path determination portion of one implementation of a first FMA sub-operation of a non-atomic split-path FMA calculation.

FIG. 7 illustrates a path determination portion of the FMA1 sub-operation. In block 408, the FMA1 sub-operation determines the EffSub variable. An EffSub of binary one indicates whether the accumulation of the accumulator operand to the product of the multiplier operands would result in an effective subtraction. In block 411, the FMA1 sub-operation selectively causes a bitwise negation of the accumulator operand. In block 414, the FMA1 sub-operation calculates ExpDelta. ExpDelta equals the sum of the multiplier and multiplicand exponents reduced by the accumulator exponent and exponent bias. ExpDelta determines not only the relative alignment of product mantissa and accumulator mantissa for the purpose of addition, but also— together with the EffSub variable—whether accumulation with the accumulator operand will be performed by the FMA1 sub-operation.

In block 417, the FMA1 sub-operation determines the path control signal Z. A binary one value indicates that a summation with the accumulator operand will be performed in the FMA1 sub-operation, using the modified multiplier 45 circuit. In one implementation, the FMA1 sub-operation assigns Z a binary one if ExpDelta is greater than or equal to negative one and also assigns Z a binary one if EffSub is binary one and ExpDelta is negative two. Other implementations may carve up the ExpDelta and EffSub number space differently.

Figure 8:
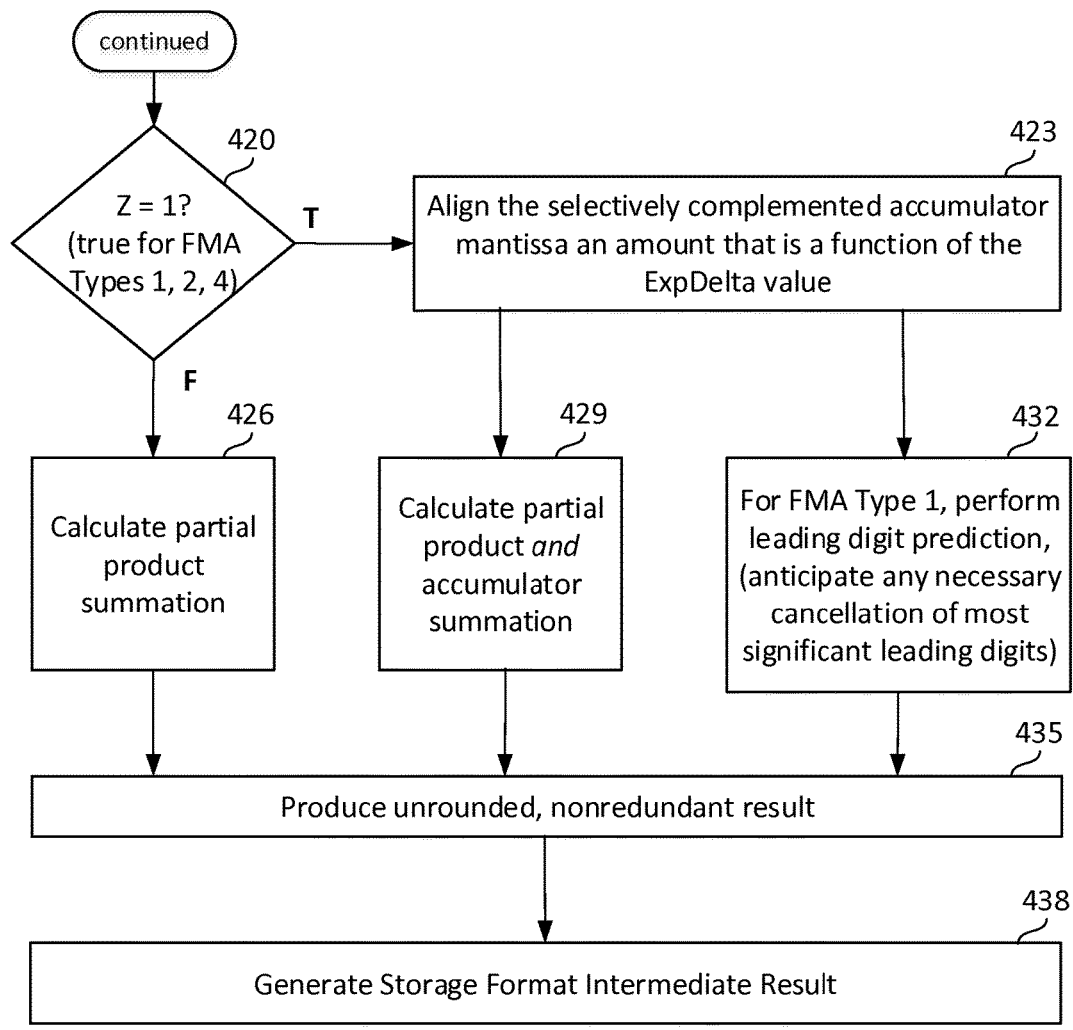
FIG. 8 is a functional block diagram illustrating a multiplication and accumulation portion of a first FMA sub-operation of a non-atomic split-path FMA calculation.

FIG. 8 is a functional block diagram illustrating a multiplication and conditional accumulation portion of the FMA1 sub-operation. In block 420, the FMA1 sub-operation selects an accumulation path for the accumulation operand. If Z is a binary zero, then in block 426, the FMA1 sub-operation calculates the sum of the partial products of the multiplier operands, without also accumulating the accumulator operand. Alternatively, if Z is a binary one, then in block 423 the FMA1 sub-operation aligns the selectively complemented accumulator mantissa an amount that is a function of the ExpDelta value, which in one implementation equals ExpDelta plus a shift constant.

In block 426/429, the FM1 sub-operation performs a first accumulation of either (a) the partial products of the multiplier and multiplicand operands (426) or (b) the accumulator operand with the partial products of the multiplier and multiplicand operands (429). In block 432, the FMA1 sub-operation conditionally performs a leading digit prediction to anticipate any necessary cancellation of the most significant leading digits of the sum. The leading digit prediction is conditioned on the FMA operation being a Type 1 FMA operation 75, and is performed in parallel with a portion of block 429's summation. Alternatively, the leading digit prediction logic may be connected and used for any results produced by either block 426 or block 429.

As a result of the actions performed in block 426 or blocks 429 and 432, the FMA1 sub-operation produces an unrounded, nonredundant normalized summation result 145 (block 435). From this, the FMA1 sub-operation generates a storage format intermediate result 150 (block 438). Once the storage format intermediate result 150 is stored or dispatched to the forwarding bus 40, the FMA1 sub-operation is concluded, freeing the resource (e.g., an instruction execution unit such as a modified multiplier 45) that executed the FMA1 sub-operation to perform other operations which may be unrelated to the FMA operation. A reasonably skilled artisan would understand that this is equally applicable to pipelined multipliers that may process several operations simultaneous through consecutive stages.

Figure 9A:
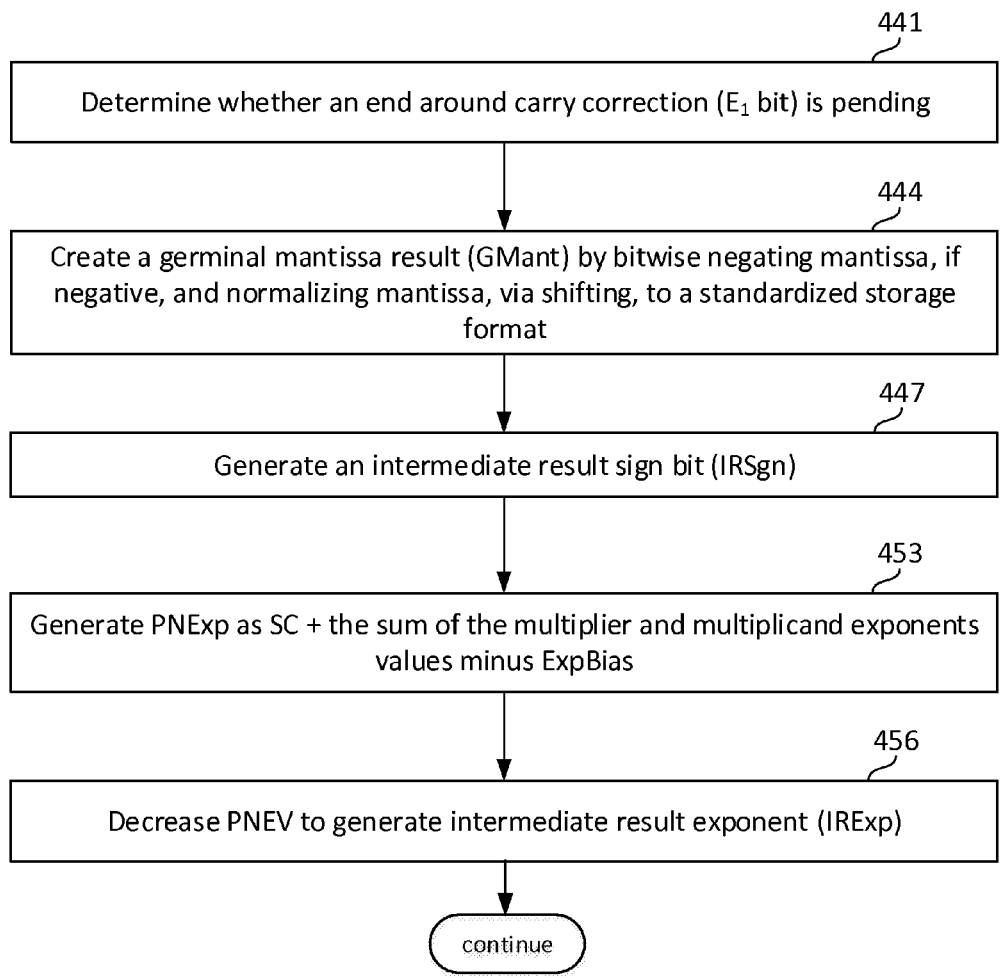
FIGS. 9A and 9B are a functional block diagram illustrating a storage format intermediate result generating portion of a first FMA sub-operation of a non-atomic split-path FMA calculation.
Figure 9B:
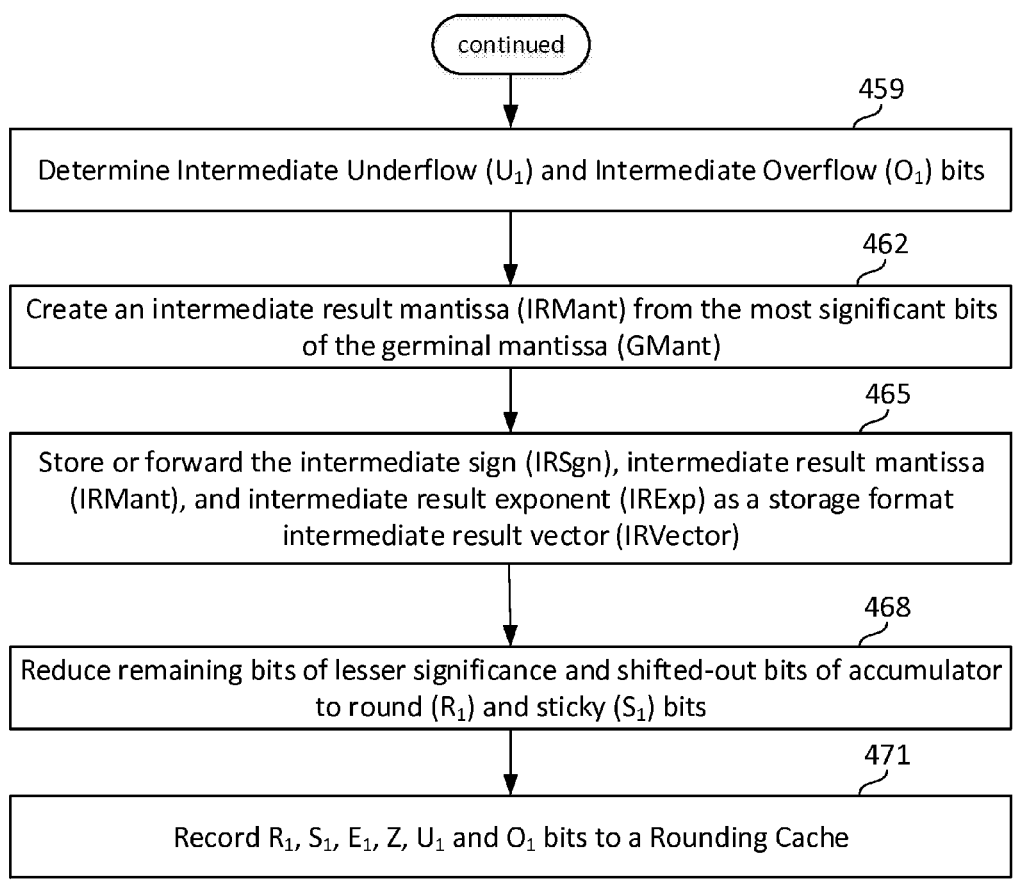

FIGS. 9A and 9B illustrate the process of generating the storage format intermediate result 150 in more detail. In block 441, the FMA1 sub-operation determines whether an end-around carry correction is pending due to an accumulation with the accumulator operand that constituted an effective subtraction. If both Z and EffSub are binary one (i.e., a Type 1 FMA operation 75 or a type 4 FMA operation 90), and the unrounded nonredundant result from block 435 is positive, then the FMA1 sub-operation assigns the variable $E_1$ a binary one.

In block 444, the FMA1 sub-operation creates a germinal mantissa result (GMant) by bitwise negating the mantissa, if negative, and normalizing the mantissa, via shifting, to a standardized storage format.

In block 447, the FMA1 sub-operation generates an intermediate result sign (IRSgn). If E is a binary zero and Z and EffSub are both binary one, then IRSgn is the logical XNOR or the multiplicand and multiplier sign bits. Otherwise, IRSgn is the logical XOR of the multiplicand and multiplier sign bits.

In block 453, the FMA1 sub-operation generates PNExp as SC+the sum of the multiplier and multiplicand exponents values minus ExpBias.

In block 456, the FMA1 sub-operation decreases PNExp to account for the normalization of PNMant, thereby generating the intermediate result exponent value (IRExp).

In block 459, the FMA1 sub-operation determines the intermediate underflow ($U_1$) and intermediate overflow ($O_1$) bits.

In block 462, the FMA1 sub-operation creates an intermediate result mantissa (IRMant) from the most significant bits of the germinal mantissa (GMant).

In block 465, the FMA1 sub-operation saves IRSgn, IRMant, and IRExp, which together compose the intermediate result vector IRVector, to storage, such as a rename register.

In block 468, the FMA1 sub-operation reduces the LSBs of the GMant and the partial product adder 240's shifted-out bits (XtraStky) into round ($R_1$) and sticky ($S_1$) bits, and in an alternative implementation, also a guard bit ($G_1$).

In block 471, the FMA1 sub-operation records the $R_1$, $S_1$, $E_1$, Z, $U_1$, and $O_1$ bits and, if provided, the $G_1$ bit, to a rounding cache 55.

Figure 10:
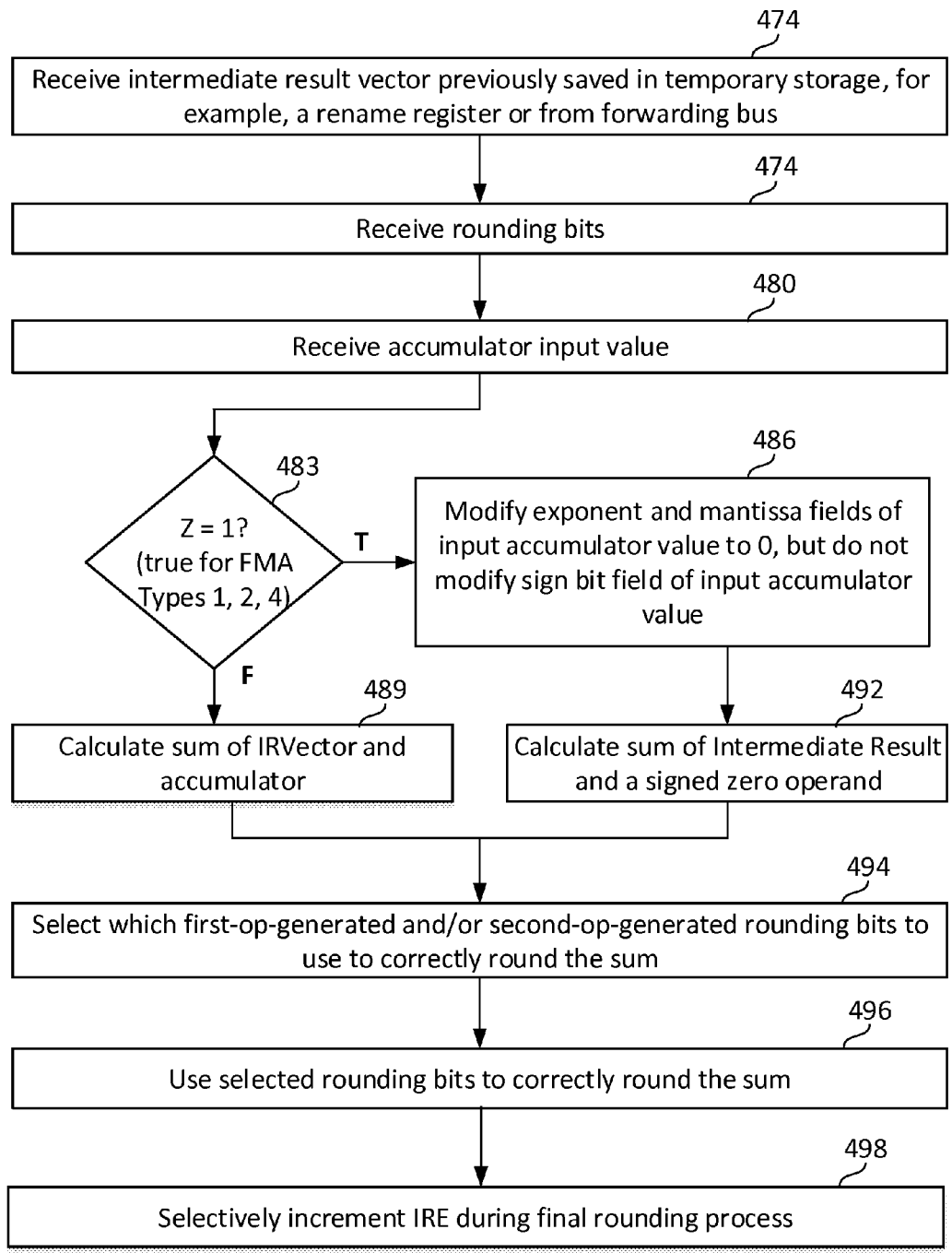
FIG. 10 is a functional block diagram illustrating a second FMA sub-operation of a non-atomic split-path FMA calculation.

FIG. 10 is a functional block diagram illustrating a second FMA sub-operation of a non-atomic split-path FMA calculation.

In block 474, the FMA2 sub-operation receives the intermediate result vector IRVector previously saved in storage, such as a rename register. Alternatively, the FMA2 sub-operation receives IRVector from a forwarding bus.

In block 477, the FMA2 sub-operation receives rounding bits previously saved in storage, such as a rounding cache 55. Alternatively, the FMA2 sub-operation receives the rounding bits from a forwarding bus.

In block 480, the FMA2 sub-operation receives the accumulator input value.

In decision block 483, the FMA2 sub-operation examines the Z bit received in block 474. If the Z bit is binary one (or true), indicating that summation with the accumulator has already been performed by the FMA1 sub-operation, then flow proceeds to block 486. Otherwise, flow proceeds to block 489.

In block 486, the FMA2 sub-operation modifies the exponent and mantissa fields of the accumulator input value to zero. In one implementation, the FMA2 sub-operation does not modify the sign bit of the input accumulator. Subsequently, in block 492, the FMA2 sub-operation calculates the sum of the intermediate result vector with a signed zero operand. Flow then proceeds to block 494.

In block 489, the FMA2 sub-operation calculates the sum of the intermediate result vector with the accumulator. Flow then proceeds to block 494.

In block 494, the FMA2 sub-operation uses the Z, $U_1$ and $O_1$ bits generated by the FMA1 sub-operation along with the $U_2$ and $O_2$ bits generated by the FMA2 sub-operation to select which of the rounding bits $E_1$, $E_2$, $R_1$, $R_2$, $S_1$, and $S_2$ to use to correctly round the mantissa of the sum.

In block 496, the FMA2 sub-operation uses the selected rounding bits to correctly round the sum. In parallel with the mantissa rounding process, the FMA2 sub-operation selectively increments IRExp (block 498). In this manner, the FMA2 sub-operation produces a final rounded result.

It will be understood that many of actions illustrated in FIGS. 7-10 need not be performed in the order illustrated. Moreover, some of the actions illustrated in FIGS. 7-10 may be performed in parallel with each other.

Application to Calculation Types

This section describes how the functional relationship between various variable values described above applies to the five different "types" of calculations of FIG. 2. This section focuses on the calculation, sign, and normalization of PNMant and the values of EffSub, ExpDelta, Z, E and IntSgn pertinent to each data type.

First Type

As shown in FIG. 2, Type 1 FMA calculations 785 are characterized as those in which the operation involves an effective subtraction (therefore, EffSub=1) and in which C is sufficiently close in magnitude (e.g., $-2 \leq \text{ExpDelta} \leq 1$) in relation to the products of A and B that the modified multiplier 45 is selected to perform the accumulation with C (therefore, Z=1), which may result in mass cancellation.

Because accumulation will be performed in the modified multiplier 45 and will result in an effective subtraction (i.e., EffSub=1 and Z=1), the accumulator alignment and injection logic 220 causes and/or selects a bitwise negation of the accumulator operand mantissa value $C_M$ before injecting it into the partial product adder 240. The accumulator alignment and injection logic 220 uses ExpDelta to align the accumulator mantissa, relative to the partial products, within the partial product adder 240.

A full summation to an unrounded, nonredundant value 145 (i.e., PNMant) is then performed in accordance with methods typical of prior art multiply execute units, including this additional selectively bitwise negated, aligned, accumulator input value in the summation of partial products. PNMant therefore represents the arithmetic difference between the product of multiplier and multiplicand mantissa values and accumulator mantissa value, in one's complement form.

PNMant may be positive or negative. If PNMant is positive, then an end-around carry is needed, and the pending end-around carry indicator $E_1$ is assigned a binary one. If PNMant is negative, then no end-around carry is needed, and $E_1$ is assigned a binary zero. It will be understood that the assigned value of $E_1$ is a function of not only PNMant, but also of the values of Z and EffSub both being binary one, as they are for Type 1 calculations 75.

In parallel with part of the partial product and accumulator input summation, a leading digit prediction is performed to anticipate any necessary cancellation of most significant leading digits. As noted earlier, this is in one preferred implementation done in circuitry parallel to the final adder 125 during summation to PNMant.

As would be understood by those reasonably skilled in the practice of floating point computational design, even if no subtractive cancellation of leading digits occurs, PNMant may need a normalization of zero, one, or two bit positions in accordance with the contribution of SC to PNExp to align it with the desired storage format for the intermediate result 150 described and employed by this invention. If mass cancellation occurs, significantly more shifting may be required. Also, if PNMant is negative, then the value is bitwise negated. This selective normalization and bitwise negation is performed on PNMant to produce the germinal mantissa value GMant, the most significant m bits of which become the intermediate result mantissa IRMant.

The intermediate result sign IRSgn is calculated as either the logical XOR or the XNOR—depending on the value of $E_1$—of the multiplicand sign bit As and the multiplier sign bit $B_S$. If $E_1$ is binary one, IRSgn is calculated as the logical exclusive-or (XOR) of the multiplicand sign bit and the multiplier sign bit. If $E_1$ is binary zero, IRSgn is advantageously calculated as the logical exclusive-nor (XNOR) of the multiplicand sign bit and the multiplier sign bit.

Turning now to the FMA2 operation, the modified adder 50 receives the stored or forwarded rounding bits, including path control signal Z. Because Z is 1, the intermediate result vector IRVector needs rounding, and potentially other minor adjustments, to produce a final multiply-accumulate result. In one implementation, the modified adder 50 sums the intermediate result vector IRVector with a zero operand (or in another implementation, a binary signed zero operand) instead of with the supplied second operand, accumulator C.

As part of the final processing, the modified adder 50 may modify the received IRExp to encompass a larger numerical range prior to summation and rounding completion, for example, to encompass the underflow and overflow exponent ranges for the target data type of the FMA operation. According to the received value Z=1 bit, the modified adder 50 then rounds IRVector using the received R, S, U, O, and E bits in a manner that is largely conventional, a process that may include incrementation of IRExp.

Second Type

As shown in FIG. 2, Type 2 FMA calculations 80 are characterized as those in which the operation does not involve an effective subtraction (therefore, EffSub=0) and in which C is sufficiently small in magnitude in relation to the products of A and B that the modified multiplier 45 is selected to perform the accumulation with C (therefore, Z=1).

Because the operation will not result in an effective subtraction (i.e., EffSub=0), the accumulator alignment and injection logic 220 does not cause or select a bitwise negation of the accumulator operand mantissa value $C_M$ before injecting it into the partial product adder 240.

The accumulator alignment and injection logic 220 does inject the accumulator mantissa into the partial product adder 240, using ExpDelta to align the accumulator mantissa relative to the partial products.

No negative value of PNMant will be produced. Additionally, the positive value of PNMant produced is not the result of a one's complement subtraction and therefore does not require end around carry correction. Therefore, the pending end-around carry indicator $E_1$ is assigned a binary zero.

Because this is not an effective subtraction, no subtractive mass cancellation of leading digits will happen, and consequently no leading digit prediction need be performed to anticipate such a cancellation. Alternatively, leading digit prediction may be used to anticipate required normalization of 0, 1, or 2 bit positions in accordance with the contribution of SC to PNExp.

The summation of the product of A and B with C may produce an arithmetic overflow having arithmetic significance, or weight, one digit position greater than the product of multiplier and multiplicand would have otherwise, as would be understood by those reasonably skilled in the practice of floating point computational design. Consequently a normalization of zero, one, or two bit positions of PNMant may be necessary to align that value with the desired storage format for the intermediate result described and employed by this invention. This normalization produces the germinal mantissa value GMant, the most significant m bits of which become the intermediate result mantissa IRMant.

The prenormalized exponent PNExp is calculated by first adding the input multiplier and multiplicand exponent values, and then subtracting any exponent bias value, and finally adding SC=2 in accordance with the most negative ExpDelta for which Z=1. As FIG. 2 illustrates for Type 2 calculations, the magnitude of C is not significantly greater than the magnitude of the product of A and B, so the resulting sum will be equal to or larger than the input accumulator.

Because the operation is not an effective subtraction (i.e., EffSub=0), the intermediate result sign IRSgn is calculated as the logical XOR of the multiplicand sign bit As and the multiplier sign bit $B_S$.

Turning now to the FMA2 operation, the modified adder 50 receives the stored or forwarded rounding bits, including path control signal Z. Because Z is binary one, the intermediate result vector IRVector need only some final processing—primarily rounding—to produce a final multiply-accumulate result. In one implementation, the modified adder 50 sums the intermediate result vector IRVector with a zero operand (or in another implementation, a binary signed zero operand) instead of with the supplied second operand, accumulator C.

As part of the final processing, the modified adder 50 may modify IRExp to encompass a larger numerical range, for example, to encompass the underflow and overflow exponent ranges for the target data type of the FMA operation. The modified adder 50 rounds IRVector in a manner that is largely conventional, a process that may include incrementation of IRExp, to produce a final correct result.

Third Type

As shown in FIG. 2, Type 3 FMA calculations 85 are characterized as those in which the operation does not involve an effective subtraction (therefore, EffSub=0) and in which C is sufficiently large in relation to the products of A and B that the modified adder 50 is selected to perform the accumulation with C (therefore, Z=0).

Thus, EffSub is a binary zero. Moreover, the path control signal Z is binary zero, designating that summation with accumulator operand is not performed. And because Z and EffSub are both binary zero, the pending end-around carry indicator $E_1$ is assigned binary zero.

Because Z is binary zero, the accumulator alignment and injection logic 220 does not align the mantissa of the accumulator input within the multiplier unit partial product summation tree. Alternatively, the accumulator alignment and injection logic 220 causes such aligned input to have arithmetic value zero.

A full summation of the partial products to unrounded, nonredundant value is then performed in accordance with methods typical of prior art multiply execute units, which does not include the input accumulator mantissa value. Because this FMA type is not an effective subtraction (i.e., EffSub=0), the summation will produce a positive PNMant, which is indicated by SumSgn. Additionally, the positive value of PNMant is not the result of a one's complement subtraction and therefore does not require end around carry correction.

Because this is not an effective subtraction, no subtractive mass cancellation of leading digits will happen, and consequently no leading digit prediction is performed to anticipate such a cancellation.

The product of A and B may produce an arithmetic overflow of one digit position in the product of multiplier and multiplicand mantissas. Consequently a normalization of zero or one bit positions of the positive, unrounded, nonredundant value may be necessary to align that value with the desired intermediate result format described and employed by this invention. This normalization produces the germinal mantissa value GMant, the most significant m bits of which become the intermediate result mantissa IRMant.

Because the previously determined path control signal Z is binary zero, indicating that accumulation has been not performed, the intermediate result sign IRSgn is calculated as the logical XOR of the multiplicand sign bit As and the multiplier sign bit $B_S$.

Turning now to the FMA2 operation, the modified adder 50 receives the stored or forwarded rounding bits, including Z. Because Z is binary zero, the modified adder 50 causes the intermediate result vector, the first operand, to be summed with accumulator C, the second operand.

Prior to performing this accumulation, the modified adder 50 may modify IRExp to encompass a larger numerical range, for example, to encompass the underflow and overflow exponent ranges for the target data type of the FMA operation. Because this is a Type 3 calculation 85 in which the accumulator value dominates the result, IRExp will be less than the accumulator input exponent value.

Advantageously, this enables far path accumulation of the modified adder 50's two operands. In far path accumulation, the mantissa of an operand having a smaller exponent value is shifted right during alignment. Any mantissa bits thusly shifted beyond the desired rounding bit then contributes to the rounding calculations. Because the accumulator dominates the result, it may not contribute bits to rounding calculations, simplifying the necessary rounding calculations.

The modified adder 50 will use the $G_2$ (if any), $R_2$, $S_2$, and $E_2$ (having binary value 0) rounding bits produced as part of the operation performed by the modified adder 50, in conjunction with $R_1$, $S_1$, $E_1$ to round the sum of the intermediate result and accumulator input value, to produce a final rounded, correct, result for the FMA calculation as would be understood by those reasonably skilled in the art of floating point computational design.

Fourth Type

As shown in FIG. 2, Type 4 FMA calculations 90 are characterized as those in which the operation does involve an effective subtraction (therefore, EffSub=1) and in which C is sufficiently small in magnitude in relation to the products of A and B that the modified multiplier 45 is selected to perform the accumulation with C (therefore, Z=1).

Because accumulation will be performed in the modified multiplier 45 and will result in an effective subtraction (i.e., EffSub=1 and Z=1), the accumulator alignment and injection logic 220 causes and/or selects a bitwise negation of the accumulator operand mantissa value $C_M$ before injecting it into the partial product adder 240. The accumulator alignment and injection logic 220 uses ExpDelta to align the accumulator mantissa, relative to the partial products, within the partial product adder 240.

Because the product of A and B is significantly greater in magnitude than C, subtractive mass cancellation of leading digits will not happen, and consequently no leading digit prediction is performed to anticipate such a cancellation.

Furthermore, the summation process produces a positive PNMant. Consequently, pending end-around carry indicator $E_1$ is assigned a binary one, later signaling to the modified adder 50 that an end around carry correction is pending for the intermediate result mantissa.

As would be understood by those reasonably skilled in the practice of floating point computational design, PNMant may need a shift, or normalization, of zero, one, or two bit positions to align it with the desired storage format for the intermediate result described and employed by this invention, in accordance with the contribution of SC to PNExp. This normalization is then selectively performed on the unrounded, nonredundant value, producing the germinal mantissa value GMant, the most significant m bits of which become the intermediate result mantissa IRMant.

Because Type 4 calculations 90 involve an accumulation of C (i.e., Z=1) that constitutes an effective subtraction (i.e., EffSub=1), producing a positive PNMant in a context that requires an end-around carry (i.e., $E_1$ is 1), the intermediate result sign IRSgn is calculated as the logical XOR of the multiplicand sign bit As and the multiplier sign bit $B_S$.

Turning now to the FMA2 operation, the modified adder 50 receives the stored or forwarded rounding bits, including path control signal Z. Because Z is 1, the intermediate result vector IRVector need only some final processing—primarily rounding—to produce a final multiply-accumulate result. In one implementation, the modified adder 50 causes the intermediate result vector to be summed with a zero operand (or in another implementation, a binary signed zero operand) instead of with the supplied second operand, accumulator C.

Prior to performing this accumulation with zero (or a binary signed zero), the modified adder 50 may modify IRExp to encompass a larger numerical range, for example, to encompass the underflow and overflow exponent ranges for the target data type of the FMA operation.

In response to the E bit binary value received in the storage format intermediate result 150, an end around carry correction may be required in accordance with a one's complement effective subtraction potentially performed during the first microinstruction. Thus, the E bit is provided along with the $G_1$ (if any), $R_1$, and $S_1$ bits of the storage format intermediate result 150 as supplemental input to the modified rounding logic of the modified adder 50 execution unit.

The modified rounding logic then uses the $G_1$ (if any), $R_1$, $S_1$, and $E_1$ supplemental inputs to calculate a correct rounding of the sum of the intermediate result vector and signed zero, to produce a correct result for this fourth type of FMA calculation, as would be understood by those reasonably skilled in the practice of floating point computational design.

Fifth Type

As shown in FIG. 2, Type 5 FMA calculations are characterized as those in which the operation does involve an effective subtraction (i.e., EffSub=1) and in which C is sufficiently large in magnitude in relation to the product of A and B that the modified adder 50 is selected to perform the accumulation with C (i.e., Z=0).

Because accumulation is not performed in the modified multiplier 45, the accumulator alignment and injection logic 220 selectively does not align $C_X$ within the partial product adder 240 summation tree, or causes such aligned input to have arithmetic value zero. The modified multiplier 45 performs a full summation of the partial products to PNMant in accordance with methods typical of prior art multiply execute units.

Because accumulation with C has not been performed, no subtractive mass cancellation of leading digits will happen, and consequently no leading digit prediction is performed to anticipate that. Also, while a positive PNMant is produced, it is not the result of a one's complement subtraction. Therefore, it does not require end around carry correction, and $E_1$ is assigned a binary zero.

As would be understood by those reasonably skilled in the practice of floating point computational design, PNMant may need a shift, or normalization, of zero, or one, bit positions to align it with the desired storage format for the intermediate result 150. This normalization produces the germinal mantissa value GMant, the most significant m bits of which become the intermediate result mantissa IRMant.

Because Type 5 calculations do not involve an accumulation with C (i.e., Z=0), the intermediate result sign IRSgn is calculated as the logical XOR of the multiplicand sign bit As and the multiplier sign bit $B_S$.

Turning now to the FMA2 operation, the modified adder 50 receives the stored or forwarded rounding bits, including Z. Because Z is 0, the intermediate result vector IRVector needs to be accumulated with accumulator C to produce a final multiply-accumulate result.

Because this is a Type 5 calculation in which the accumulator value dominates the result, the IRExp will be less than the accumulator input exponent value. Advantageously, this enables far path accumulation of the modified adder 50's two operands. In far path accumulation, the mantissa of an operand having a smaller exponent value is shifted right during alignment. Any mantissa bits thusly shifted beyond the desired rounding bit then contributes to the rounding calculations. Because the accumulator dominates the result, it may not contribute bits to rounding calculations, simplifying the necessary rounding calculations.

Because the pending end-around carry indicator $E_1$ received from the storage format intermediate result 150 is binary zero, no end around carry correction is pending from the FMA1 operation. Thus, the $E_1$ bit is provided along with the $R_1$ and $S_1$ bits, and the $G_1$ bit, if any, of the storage format intermediate result 150 as a supplemental input to the modified rounding logic of the modified adder 50 execution unit.

However, the accumulation performed by the modified adder 50 may separately cause a one's complement effective subtraction. So the modified rounding logic may generate rounding bits, including an end around carry, to calculate a correct rounding of the sum of the intermediate result vector and accumulator input value, to produce a correct result for this first type of FMA calculation, as would be understood by those reasonably skilled in the practice of floating point computational design.

Specialized Microinstructions

In another aspect of one implementation of the invention, the translator and/or microcode ROM 20 is configured to translate or transform FMA instructions into first and second specialized microinstructions that are respectively executed by respective multiply and add units. The first (or more) specialized microinstruction(s) may, for example, be executed in a multiply execution unit that is similar to prior art multiply units having minimal modifications suited to the described purpose. The second (or more) specialized microinstructions may, for example be executed in an adder execution unit similar to prior art adder units having minimal modifications suited to the described purpose.

Figure 11:
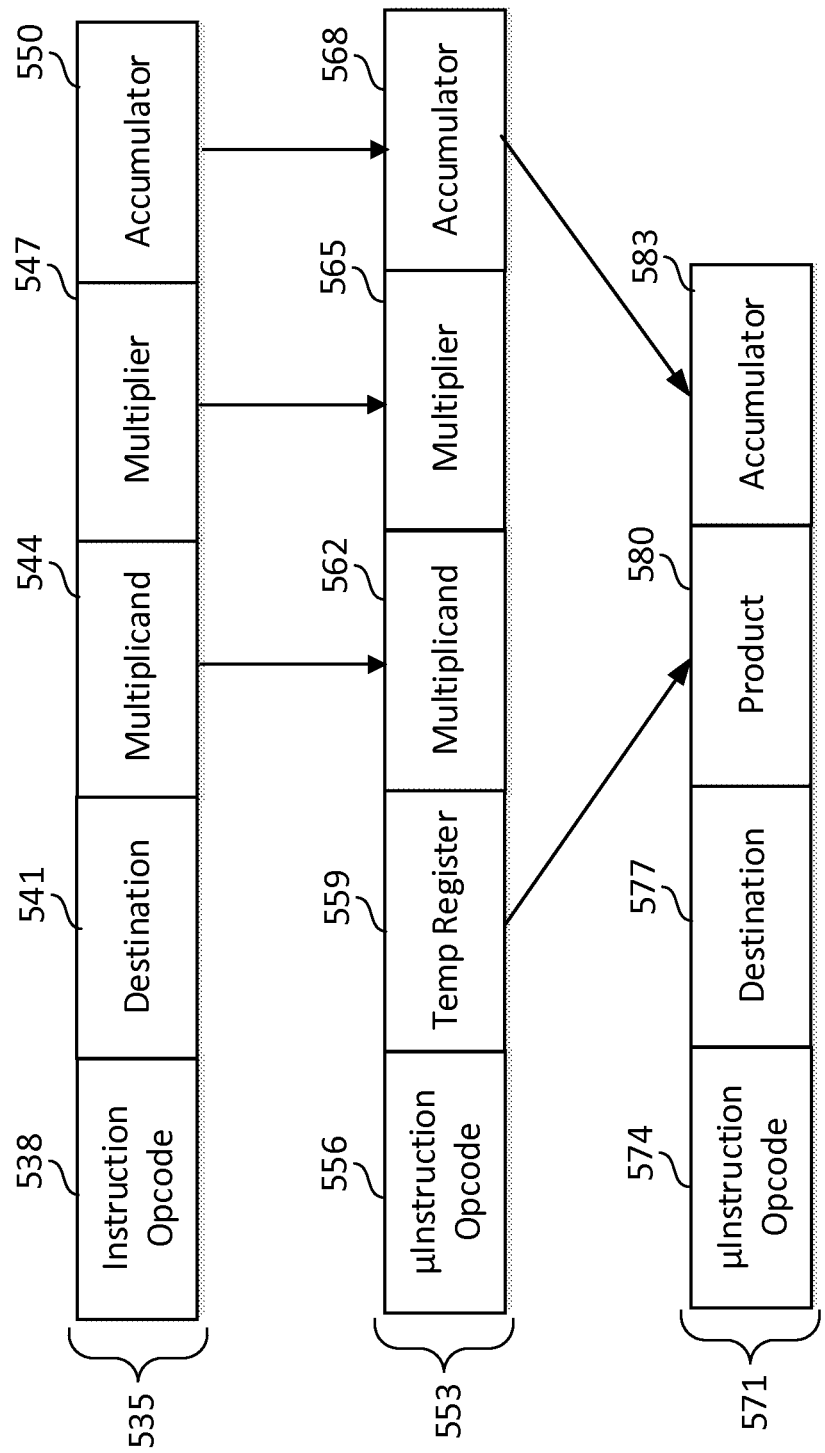
FIG. 11 illustrates one embodiment of an instruction translation of a fused FMA instruction into first and second FMA microinstructions.

FIG. 11 illustrates one embodiment of an FMA instruction translation or transformation of a fused FMA instruction 535 into first and second specialized microinstructions 553 and 571. In a non-limiting example, the fused FMA instruction 535 comprises an instruction opcode field 538, a destination field 541, a first operand (multiplicand) field 544, a second operand (multiplier) field 547, and a third operand (accumulator) field 550.

The FMA instruction 535 may be a multiply-add, a multiply-subtract, a negative multiply-add, or a negative multiply-subtract instruction, as indicated by the opcode field 538. Just as there may be several types of FMA instructions 535, there may also be several types of first specialized microinstructions 553, for example, multiply-add, multiply-subtract, negative multiply-add, and negative multiply-subtract microinstructions. These type characteristics, if any, are reflected in the opcode field 556 of the relevant microinstruction 553.

The first specialized microinstruction 553 directs the performance of some part of the arithmetic calculations necessary for FMA calculations of the first thru fifth type. The specific calculations performed vary depending on the specific type. The first specialized microinstruction 553 is dispatched to a first execution unit, such as the modified multiplier 45 described above.

The second specialized microinstruction 571 directs the performance of the remaining arithmetic calculations necessary for FMA calculations of the first thru fifth type. The specific calculations performed by the second specialized microinstruction 571 also vary depending on the specific type. In the current implementation, the second specialized microinstruction 553 is dispatched to a second execution unit, such as the modified adder 50 described above. The second specialized microinstruction 571 may have a sub-type, for example Add or Subtract, in accordance with advantageous implementation of floating point multiply-add fused operations or floating point multiply-subtract fused operations.

More particularly, the first specialized microinstruction 553 specifies first, second, and third input operands 544, 547, and 550 which may be referred to, respectively, as the multiplicand operand A, the multiplier operand B, and accumulator operand C. The first specialized microinstruction may also specify a destination field 559, which may point to a temporary register. Alternatively, the destination register 559 is implicit.

The first specialized microinstruction 553 directs performance of the FMA1 sub-operation, namely, an accumulation of the partial products of A and B, and conditionally also with C, to produce the unrounded storage format intermediate result 150. The first specialized microinstruction 553 also directs a determination of the EffSub and ExpDelta variables, causing a binary one to be assigned to a Z bit for a predetermined set of ExpDelta and EffSub values. This in turn controls several dependent processes.

A binary one Z bit designates that summation with an accumulator operand will be performed in the first operation and need not be performed by the second microinstruction. The Z bit designation and ExpDelta is then used to cause alignment of the selectively complemented accumulator mantissa within the partial product adder 240, which has appropriate modifications to accept this additional term.

The first specialized microinstruction 553 also directs a full summation to an unrounded, nonredundant value (PNMant) to be performed in accordance with methods typical of prior art multiply execute units, but including the additional selectively bitwise negated, aligned, accumulator input value $C_M$ or $\overline{C_M}$ in the summation of partial products. If PNum is negative, then this condition is noted by signal SumSgn.

The first specialized microinstruction 553 also directs PNMant to be shifted and bitwise negated to produce a germinal mantissa value (GMant), followed by a reduction of GMant to produce the intermediate result mantissa (IMant) of a storage format intermediate result 150. The intermediate result mantissa IMant is thus a normalized, absolute value of the one's complement arithmetic difference from this EffSub designated calculation, pending any correction for end around carry.

The first specialized microinstruction 553 also directs calculation of an intermediate result exponent value. First, a prenormalized exponent value (PNExp) is generated equal to a sum of the multiplicand exponent AE and multiplier exponent BE reduced by the exponent bias ExpBias and then added to a shift constant SC, in accordance with the most negative ExpDelta for which Z is assigned binary value 1. Then, an intermediate result exponent value (IRExp) is generated from the PNExp, decremented by an amount that accounts for normalization of the mantissa performed by the normalizing shifter 130.

The first specialized microinstruction 553 also directs calculation of an intermediate result sign IRSgn. The intermediate result sign IRSgn, together with the intermediate result mantissa IRMant and intermediate result exponent IRExp, make up the storage format intermediate result 150 vector IRVector.

The first specialized microinstruction 553 also causes several rounding bits in addition to Z to be generated. The least significant bits of GMant not incorporated in the intermediate result mantissa are reduced in representation to round (R) and sticky (S) bits, and, in one implementation, also a guard (G) bit. If the partial product adder 240 has accumulated C with the partial products of A and B, and the operation was an effective subtraction that produced a positive PNMant value, then a binary one is assigned to an end-around-carry bit E, indicating a need to perform an end-around carry. The first specialized microinstruction also causes intermediate underflow (U) and intermediate overflow (O) bits to be determined.

Finally, the first specialized microinstruction 553 in one implementation causes storage of the storage format intermediate result 150 vector IRVector in memory, in another implementation causes it to be forwarded, and in yet another implementation causes it to be both stored and forwarded. Likewise, the first specialized microinstruction 553 in one implementation causes storage of the rounding bits in memory, in another implementation causes it to be forwarded, and in another implementation causes it to be both stored and forwarded. This enables the execution unit tasked with executing the first specialized microinstruction to perform other operations unrelated to the FMA operation after the first FMA microinstruction is executed and before the second FMA microinstruction is executed.

The second specialized microinstruction 571 provides an opcode 574 and specifies first and second input adder operands 580 and 583, respectively. The second specialized microinstruction 571 causes the FMA2 operation to be performed. This includes a conditional accumulation of C with the intermediate result mantissa if C was not accumulated by the first specialized microinstruction 571. The second specialized microinstruction 571 also causes generation of a final rounded result of the FMA operation.

The first accumulator operand 580 has as its value the product generated by the first specialized microinstruction 553, and the second accumulator operand 583 has as its value the same accumulator value designated by the first specialized microinstruction. In one implementation, a source operand field 580 of the second specialized microinstruction 571 points to the same register as the destination field 559 of the first specialized microinstruction 553. The second specialized microinstruction 571 also specifies a destination register 577, which in one implementation is the same register as the destination field 541 of the FMA instruction 535.

CONCLUSION

Although the current implementation describes provision for one's complement accumulation during effective subtraction, alternate implementations may adapt the methods of this invention to employ two's complement accumulation during effective subtraction as would be understood by a person reasonably skilled in the practice of arithmetic or floating point computational design.

Certain advantages are realized by this invention. It provides IEEE specification compatibility and correctness of desired FMA arithmetic result not evidently provided by other implementations, particularly with respect to IEEE rounding requirements.

This invention maximizes availability of independent arithmetic functional units for instruction dispatch by retaining separately available multiplier and adder units, permitting the computer processor to more fully exploit ILP for a particular invested implementation cost. Stated differently, it allows maximal concurrent utilization of minimally implemented hardware, to complete the most frequently expected calculations as fast as possible, as is desirous. This enhances throughput of arithmetic results. This is enabled because the necessary first and second (or more) microinstructions of special type can be dispatched and executed in a temporally and/or physically dissociated manner. Thus, while the first such microinstruction for FMA is dispatched to a multiply functional unit, a second or more, unrelated, microinstruction(s) may be simultaneously dispatched to one or more adder functional units.

Likewise, while the second such microinstruction for FMA is dispatched to an adder functional unit, any other unrelated microinstruction requiring multiply functionality may be simultaneously dispatched to a multiply functional unit.

As a result, the number of such provided multiply and adder functional units may be more flexibly configured according to desired overall performance and ILP capability of the required system, with less implementation cost per functional unit than an entire, monolithic FMA hardware. The ability of a computer system to reorder microinstructions is thus enhanced, with reduced cost and power consumption.

This invention does not require the use of large, special purpose, hardware to minimize instruction latency as is required by other designs. Other FMA hardware implementations require large and complex circuit functionality, such as anticipatory normalization, anticipatory addition, anticipatory sign calculation, and complex rounding circuitry. These complex elements often become a critical timing path in realizing the final design, consume additional power during calculation, and require valuable physical circuit space to implement.

This invention does not require the implementation of special bypass circuitry or modalities within a large FMA hardware to provide minimal latency for simpler add or multiply instructions as may be provided by prior art.

Other implementations of this invention, may perform more, or less, arithmetic during the first microinstruction of special type, and may perform less, or more, arithmetic during the second microinstruction of special type, meaning the allocation of computation for these microinstructions may be different. Accordingly, these other implementations may provide more, or less, modification to either/any of the separate, necessary computation units. Accordingly, these other implementations may store more, or less, of the intermediate result to the rounding cache, and may similarly provide for forwarding more, or less, of the intermediate result to a second microinstruction.

Other implementations may implement the described rounding cache as addressable register bits, content accessible memory (CAM), queue storage, or mapping function.

Other implementations may provide multiple, separate hardwares or execution units to perform the first microinstruction, and/or may provide multiple separate hardwares or execution units to perform the second microinstruction. Similarly, they may provide multiple rounding caches if advantageous to do so, such as for distinct source code instruction streams or data streams, or for multi-core computer processor implementations.

Although the current implementation is adapted to superscalar, out-of-order instruction dispatch, other implementations may be adapted to in-order instruction dispatch, for example, by removal of the rounding cache and by provision of a data forwarding network from a provided multiply computational unit to a separate adder computational unit. The example partitioning of FMA transaction types, and the minimal required hardware modifications demonstrated by this invention would be advantageous in such an adaptation to in-order instruction dispatch. While this specification describes partitioning into five FMA types, partitioning into fewer, more, and/or different types is within the scope of the invention.

Also, while the specification has described distinct modified multiply and modified adder units for performing an FMA operation, in another implementation of the invention, a multiply-accumulate unit is configured to perform the first multiply-accumulate sub-operation in response to a first multiply-accumulate instruction, save the results to external memory storage, and to perform the second multiply-accumulate sub-operation in response to a second multiply-accumulate instruction.

This invention is applicable to SIMD implementations of FMA calculations, which are sometimes referred to as a vector instruction type or vector FMA calculation, in which case there would be multiple instances of modified multipliers and multiple instances of modified adders. In one embodiment, a single rounding cache serves the needs of an SIMD application of the invention. In another embodiment, multiple rounding caches are provided to serve SIMD applications.

Although the current invention relates to the performance of a floating point fused multiply add calculation requiring a multiply calculation incorporating or followed by an addition or accumulation, other implementations may apply the methods of this invention, particularly with respect to use of a cache for certain parts of an intermediate result, to calculations or computations requiring more than two chained arithmetic operations, to different arithmetic operations, or performing those arithmetic operations in a different order. For example, it may be desirous to apply these methods to other compound arithmetic operations (i.e., arithmetic operations involving two or more arithmetic operators or three or more operands), such as chained calculations of multiply-multiply-add or multiply-add-add, to obtain increased arithmetic accuracy or increased computational throughput. Moreover, some aspects of the present invention—for example, the subdivision of an integer operation that rounds to a particular bit position into first and second sub-operations, the first of which produces an unrounded intermediate result, and the second of which generates a rounded final result from the unrounded intermediate result—are applicable to integer arithmetic. Accordingly, other implementations may record different status bits to a cache mechanism as needed.

It will be understood that the current specification describes the use of rounding bits and other internal bits for the sake of convenience, and that the invention is equally applicable to other forms of indicators, including encoded representations of rounding-related or calculation-control variables. Moreover, in many places where variables are described as having a "binary one" (a.k.a. "logical one") the invention encompasses Boolean equivalent alternate embodiments in which those such variables have a "binary zero" (a.k.a. "logical zero") and further encompasses other representations of those variables. Likewise, where variables are described as having a "binary zero," the invention encompasses Boolean equivalent alternate embodiments in which those such variables have a "binary one," and further encompasses other representations of those variables. It will also be understood that, as used herein, the term accumulation is used in a manner that encompasses both additive sums and additive differences.

Furthermore, it will be understood that the term "instruction" encompasses both "architectural instructions" and the "microinstructions" into which they might be translated or transformed. Likewise, the term "instruction execution unit" does not exclusively refer to embodiments in which the microprocessor directly executes architectural instructions (i.e., ISA machine code) without first translating or transforming it into microinstructions. As a microinstruction is a type of instruction, so "instruction execution unit" also encompasses embodiments in which the microprocessor first translates or transforms the ISA instruction into microinstructions, and the instruction execution units always and only execute the microinstructions.

In this specification, the words "mantissa" and "significand" are used interchangeably. Other terms, such as "germinal result" and "intermediate result" are used for the purpose of distinguishing results and representations produced at different stages of an FMA operation. Also, the specification generally refers to the "storage format intermediate result" as including both an intermediate result "vector" (meaning a numerical quantity) and a plurality of calculation control variables. These terms should not be construed rigidly or pedantically, but rather pragmatically, in accordance with the Applicant's communicative intent and recognizing that they may mean different things in different contexts.

It will also be understood that the functional blocks illustrated in FIGS. 1 and 3-6 may be described interchangeably as modules, circuits, subcircuits, logic, and other words commonly used within the fields of digital logic and microprocessor design to designate digital logic embodied within wires, transistors and/or other physical structures that performs one or more functions. It will also be understood that the invention encompasses alternative implementations that distribute the functions described in the specification differently than illustrated herein.

The following references are incorporated herein by reference for all purposes, including but not limited to describing relevant concepts in FMA design and informing the presently described invention.

REFERENCES

Hokenek, Montoye, Cook, "Second-Generation RISC Floating Point with Multiply-Add Fused", IEEE Journal Of Solid-State Circuits, Vol 25, No 5, October 1990.

Lang, Bruguera, "Floating-Point Multiply-Add-Fused with Reduced Latency", IEEE Trans On Computers, Vol 53, No 8, August 2004.

Bruguera, Lang, "Floating-Point Fused Multiply-Add: Reduced Latency for Floating-Point Addition", Pub TBD—Exact Title Important.

Vangal, Hoskote, Borkar, Alvanpour, "A 6.2-GFlops Floating-Point Multiply-Accumulator With Conditional Normalization", IEEE Jour. Of Solid-State Circuits, Vol 41, No 10, October 2006.

Galal, Horowitz, "Energy-Efficient Floating-Point Unit Design", IEEE Trans On Computers Vol 60, No 7, July 2011.

Srinivasan, Bhudiya, Ramanarayanan, Babu, Jacob, Mathew, Krishnamurthy, Erraguntla, "Split-path Fused Floating Point Multiply Accumulate (FPMAC)", 2013 Symp on Computer Arithmetic (paper).

Srinivasan, Bhudiya, Ramanarayanan, Babu, Jacob, Mathew, Krishnamurthy, Erraguntla, "Split-path Fused Floating Point Multiply Accumulate (FPMAC)", 2014 Symp on Computer Arithmetic, Austin TX, (slides from www.arithsymposium.org).

Srinivasan, Bhudiya, Ramanarayanan, Babu, Jacob, Mathew, Krishnamurthy, Erraguntla, U.S. Pat. No. 8,577, 948 (B2), Nov. 5, 2013.

Quach, Flynn, "Suggestions For Implementing A Fast IEEE Multiply-Add-Fused Instruction", (Stanford) Technical Report CSL-TR-91-483 July, 1991.

Seidel, "Multiple Path IEEE Floating-Point Fused Multiply-Add", IEEE 2004.

Huang, Shen, Dai, Wang, "A New Architecture For Multiple-Precision Floating-Point Multiply-Add Fused Unit Design", Pub TBD, Nat'l University of Defense Tech, China (after) 2006.

Paidimarri, Cevrero, Brisk, Ienne, "FPGA Implementation of a Single-Precision Floating-Point Multiply-Accumulator with Single-Cycle Accumulation", Pub TBD.

Henry, Elliott, Parks, "X87 Fused Multiply-Add Instruction", U.S. Pat. No. 7,917,568 (B2), Mar. 29, 2011.

Walaa Abd El Aziz Ibrahim, "Binary Floating Point Fused Multiply Add Unit", Thesis Submitted to Cairo University, Giza, Egypt, 2012 (retr from Google).

Quinell, "Floating-Point Fused Multiply-Add Architectures", Dissertation Presented to Univ Texas at Austin, May 2007, (retr from Google).

Author Unknown, "AMD Athlon Processor Floating Point Capability", AMD White Paper Aug. 28, 2000.

Cornea, Harrison, Tang, "Intel Itanium Floating-Point Architecture" Pub TBD.

Gerwig, Wetter, Schwarz, Haess, Krygowski, Fleischer, Kroener, "The IBM eServer z990 floating-point unit", IBM Jour Res & Dev Vol 48 No 3/4 May, July 2004.

Wait, "IBM PowerPC 440 FPU with complex-arithmetic extensions", IBM Jour Res & Dev Vol 49 No 2/3 March, May 2005.

Chatterjee, Bachega, et al, "Design and exploitation of a high-performance SIMD floating-point unit for Blue Gene/L", IBM Jour Res & Dev, Vol 49 No 2/3 March, May 2005.

The invention claimed is:

1. A microprocessor comprising:
   an instruction execution unit operable to perform a portion of an arithmetic calculation to generate an intermediate result vector and to concomitantly generate a plurality of calculation control indicators as a function of generating the intermediate result vector;
   wherein the calculation control indicators indicate how subsequent calculations to complete the arithmetic calculation should proceed; and
   storage external to the instruction execution unit configured to store the intermediate result vector and the plurality of calculation control indicators.

2. The microprocessor of claim 1, wherein the storage comprises a general purpose storage and a calculation control indicator storage, the microprocessor further comprising:
   a result bus for conveying results from the instruction execution unit to the general purpose storage; and
   a data path for storing and loading calculation control indicators to and from the calculation control indicator storage;
   wherein the result bus is separate from the data path, the general purpose storage is accessible by most instructions of an instruction set of the microprocessor to store instruction results, and the calculation control indicator storage is accessible only to instructions operable to store or load a calculation control indicator.

3. The microprocessor of claim 1, wherein the instruction execution unit is an arithmetic processing unit configured with three or more operand inputs and the intermediate result vector is generated from an application of a first arithmetic operation of a compound arithmetic operation to at least two of the operand inputs.

4. The microprocessor of claim 3, wherein the plurality of calculation control indicators indicate how a second arithmetic operation of the compound arithmetic operation, using a second arithmetic operator of a compound arithmetic operation, should proceed.

5. The microprocessor of claim 3, wherein the arithmetic operators are fundamental arithmetic operators, selected from the group consisting of add, subtract, multiply, and divide.

6. The microprocessor of claim 3, wherein the compound arithmetic operation is a sequential arithmetic operation.

7. The microprocessor of claim 3, wherein the compound arithmetic operation is a multiply-accumulate operation, the first arithmetic operation is at least a multiply of a multiplicand operand with a multiplier operand.

8. The microprocessor of claim 3, wherein the calculation control indicators provide information regarding how much of the compound arithmetic operation has been completed in generating the intermediate result vector.

9. The microprocessor of claim 3, wherein the calculation control indicators provide information regarding whether the first arithmetic operation resulted in an underflow or overflow condition.

10. The microprocessor of claim 3, wherein the intermediate result vector, considered in isolation from the calculation control indicators, is represented with fewer bits than necessary to consistently generate an arithmetically correct representation of the compound arithmetic operation; but wherein the intermediate result vector, in combination with the plurality of calculation control indicators, provide sufficient information to generate an arithmetically correct representation of the compound arithmetic operation; wherein an arithmetically correct representation of the compound arithmetic operation is indistinguishable from a result that would be generated by an infinitely precise calculation of the compound arithmetic operation subsequently reduced in significance to a target data size.

11. The microprocessor of claim 1, wherein the intermediate result vector is an unrounded value and the calculation control indicators provide information for generating an arithmetically correct rounded result from the intermediate result vector.

12. The microprocessor of claim 1, wherein the calculation control indicators provide an indication of which sign to assign to a zero result, if the final result is a zero value.

13. A microprocessor comprising:
    a plurality of instruction execution units configured to generate unrounded results and a plurality of rounding indicators for rounding the unrounded results; and
    a rounding cache external to the instruction execution units configured to store the plurality of rounding indicators.

14. The microprocessor of claim 13, wherein the rounding cache is an associative cache.

15. The microprocessor of claim 13, further comprising a general purpose memory store, distinct from the rounding cache, for storing unrounded results generated by the plurality of instruction execution units.

16. The microprocessor of claim 13, further comprising a rounding bit transfer path, a result bus distinct from the rounding bit transfer path, and a general purpose memory store, wherein the instruction execution units are configured to output the unrounded results to the result bus and to output the rounding indicators on the rounding bit transfer path to the rounding cache.

17. The microprocessor of claim 13, wherein at least one of the plurality of instruction execution units is configured to generate an unrounded result in response to an instruction of a first type and a rounded result in response to an instruction of a second type.

18. The microprocessor of claim 13, wherein the microprocessor is configured to supply (a) an unrounded result generated by a first one of the plurality of instruction execution units to a second one of the plurality of instruction execution units and (b) at least one of the plurality of rounding indicators from the rounding cache to the second one of the plurality of instruction execution units; and wherein the second one of the plurality of instruction execution units is configured to perform a mathematical operation on at least the unrounded result operand to generate a final rounded result using the supplied at least one of the plurality of rounding indicators.

19. A microprocessor comprising:
a first instruction execution unit operable to generate an intermediate result vector and a plurality of calculation control indicators that indicate how subsequent calculations to generate a final result from the intermediate result vector should proceed; and
a forwarding bus external to the instruction execution unit configured to forward the intermediate result vector and the plurality of calculation control indicators to a second instruction execution unit.

20. The microprocessor of claim 19, wherein the first instruction execution unit is configured to generate an unrounded result in response to an instruction of a first type and a rounded result in response to an instruction of a second type.

* * * * *